United States Patent
Taber et al.

(10) Patent No.: US 11,828,862 B2
(45) Date of Patent: Nov. 28, 2023

(54) PERSONNEL LOCATION AND MONITORING SYSTEM

(71) Applicant: TABER INNOVATIONS GROUP LLC, Las Vegas, NV (US)

(72) Inventors: Phillip P. Taber, Las Vegas, NV (US); Timothy P. Taber, Las Vegas, NV (US)

(73) Assignee: TABER INNOVATIONS GROUP LLC, Las Vegas, NV (US)

( * ) Notice: Subject to any disclaimer, the term of this patent is extended or adjusted under 35 U.S.C. 154(b) by 0 days.

(21) Appl. No.: 18/151,971

(22) Filed: Jan. 9, 2023

(65) Prior Publication Data

US 2023/0184963 A1 Jun. 15, 2023

Related U.S. Application Data

(63) Continuation of application No. 17/325,967, filed on May 20, 2021, now Pat. No. 11,579,313, which is a
(Continued)

(51) Int. Cl.
*G01S 19/46* (2010.01)
*G01S 19/47* (2010.01)
(Continued)

(52) U.S. Cl.
CPC ............ *G01S 19/46* (2013.01); *G01S 5/0226* (2013.01); *G01S 5/02216* (2020.05);
(Continued)

(58) Field of Classification Search
CPC ...... G01S 19/46; G01S 19/47; G01S 5/02216; G01S 5/0226
(Continued)

(56) References Cited

U.S. PATENT DOCUMENTS 8,712,686 B2  4/2014  Bandyopadhyay et al.
9,699,621 B1  7/2017  Jarrett
(Continued)

FOREIGN PATENT DOCUMENTS

| EP | 3226034 A1 * | 10/2017 | ............ G01S 19/22 |
|---|---|---|---|
| JP | 7256241 B2 * | 4/2023 | ............... G01S 1/20 |
| WO | 2017/024462 A1 | 2/2017 | |

OTHER PUBLICATIONS

Taber Innovations Group LLC; "International Search Report and Written Opinion of the International Searching Authority"; PCT International Application No. PCT/US2019/045448; dated Nov. 19, 2019.

*Primary Examiner* — Harry K Liu
(74) *Attorney, Agent, or Firm* — Martensen IP; Michael C. Martensen

(57) ABSTRACT

A personnel location and monitoring system enables on-scene commanders in austere environments to identify, location and manage personnel. The present invention establishes a localized network of geolocation-capable transceivers which can thereafter provide communication capabilities with specially-equipped users as they ingress and egress an austere environment. Each user is equipped with an Individual Geospatial Locational Unit which provides data via a datalink with one or more of the anchors, and ultimately with a base station. From such data and the datalink itself the location of the user as well as the user's biomedical condition can be ascertained. As confidence of the location of the user drops below a predetermined threshold and/or the biomedical condition of the user raises concern with respect to the user's well-being, the present invention modifies the communication and geolocation protocols to prioritize communication and data transfer with such a user.

12 Claims, 16 Drawing Sheets

Related U.S. Application Data continuation of application No. 16/534,186, filed on Aug. 7, 2019, now Pat. No. 11,054,529.

(60) Provisional application No. 62/715,391, filed on Aug. 7, 2018.

(51) Int. Cl.
*G01S 5/02* (2010.01)
*H04W 28/02* (2009.01)
*G01S 5/06* (2006.01)

(52) U.S. Cl.
CPC ......... *G01S 19/47* (2013.01); *H04W 28/0215* (2013.01); *G01S 5/06* (2013.01)

(58) Field of Classification Search
USPC .................................................. 342/357.29
See application file for complete search history.

(56) References Cited

U.S. PATENT DOCUMENTS

| | | |
|---|---|---|
| 2009/0005073 A1 | 1/2009 | Shaffer |
| 2014/0232600 A1 | 8/2014 | Larose et al. |
| 2014/0292568 A1 | 10/2014 | Fleming et al. |
| 2015/0282112 A1 | 10/2015 | Bailer |
| 2015/0356332 A1 | 12/2015 | Turner |
| 2016/0043771 A1 | 2/2016 | Mohamadi |
| 2017/0124836 A1 | 5/2017 | Chung et al. |
| 2017/0173262 A1 | 6/2017 | Veltz |

* cited by examiner

PERSONNEL LOCATION AND MONITORING SYSTEM

RELATED APPLICATION

The present application relates to and claims the benefit of priority to U.S. Provisional Patent Application No. 62/715,391 filed Aug. 7, 2018, and is a continuation application of U.S. patent application Ser. No. 17/325,967 filed May 20, 2021, which is a continuation application of U.S. patent application Ser. No. 16/534,186 filed Aug. 7, 2019, all of which are hereby incorporated by reference in their entirety for all purposes as if fully set forth herein.

BACKGROUND OF THE INVENTION

Field of the Invention

Embodiments of the present invention relate, in general, to systems and methods for locating, tracking and monitoring personnel and/or assets and more particularly to a mobile and deployable system for dynamically locating, tracking and monitoring personnel indoors using a combination of Global Navigation Satellite System (GNSS) receivers, Ultra-Wide Band (UWB) transceivers and accelerometers.

Relevant Background

Emergency scenes, involving firefighters, police, emergency medical services (EMS) and similar emergency-scene related, immediate services (collectively, "first-responders"; "first-responder" is abbreviated as "FR"), are characterized by chaos and confusion, yet they require split-second judgment. As increasingly larger and more complex emergency situations—such as factory, warehouse or other large-scale conflagrations—arise, the challenge of locating and managing personnel escalates exponentially. Adding additional FR organizations and entities further complicates the problem with command-and-control (C2) issues, varying operational procedures, equipment interoperability and a host of additional problems arising out of differences in the various FR entities and equipment types and purposes. These added resources can complicate an emergency rather than remedying it. Yet the need and desire remain to provide an on-scene commander (OSC) the ability to quickly and accurately identify, locate and monitor each FR.

Systems that locate, track and monitor the status of personnel and/or assets generally use conventional position-locating technology—for example, GNSS technology and/or inertial/non-inertial sensors—coupled with various signal-analysis methods. A variety of factors, however, can impact the accuracy of those systems. For example, though the Global Positioning System (GPS)—a type of GNSS (for purposes of this document, "GNSS" and "GPS" may be used interchangeably)—has proved to be a very useful location and navigation tool for outdoor applications, a number of barriers impair or bar the use of GPS for indoor applications. Geolocation through GPS is achieved via method known as "multilateration" (also known as "ranging", abbreviated as, "MLAT"). MLAT is a ranging method that measures the time of flight from GPS transmitters in space to a GPS receiver on Earth. The distances covered by the signals from the GPS satellites—all transmitting the same type of signal at the same time—are the radii of circles whose circumferences upon which the receiving object's position must lie. Since the object's position can lie only along the circles' circumferences, the intersection of these arcs must be the object's position. While the establishment and refinement of GPS has tremendously advanced the ability to locate an object, this system is not without its limitations. These limitations stem from the fact that GPS receivers must maintain a direct, line-of-sight with at least four transmitting GPS satellites for accurate positioning. GPS can thus become unreliable in urban environments, mountainous terrain, inside buildings, underground, or anywhere else where line-of-sight with at least four GPS satellites cannot be maintained. Moreover, electromagnetic interference along GPS signal paths can degrade or deny positional data, as can GPS signal attenuation and/or so-called "multipath" impacts (GPS signal reflections off structures—especially prevalent in "urban canyons" [environments densely-populated with tall-buildings, e.g., cities]). Thus, in indoor environments and within close proximity of urban building structures, line-of-sight paths to GPS satellites may be substantially blocked and GPS signals may be highly degraded, rendering GPS signals attenuated typically several orders of magnitude and thus making accurate position determinations difficult or impossible.

Beyond GNSS-based position-location methods, however, an object's location can also be determined through MLAT methods using non-space-based transmitters, such as local transmitters. A cell tower is good example of such a local transmitter. Using three or more local transmitters whose position is known, the location of an object—such as a cell phone—can be determined. Knowing the positions of the cell towers, the phone's relative location can be overlaid on a map, transforming its local (or relative) position to a geospatial reference frame. But this method, too, has shortfalls. Transmitter availability is often limited, and cell-tower transmissions also suffer from line-of-sight limitations. Moreover, the location of each tower is fixed, and the capital infrastructure needed for such towers is substantial.

A need exists for a mobile, local (or relational) system that can synthesize various positioning systems' information and schema to provide adaptive, robust and reliable positional information on FRs to those in positions of FR C2 regardless of environmental conditions or limitations imposed by the physical structures within which FRs must often offer emergency response. These and other deficiencies of the prior art are addressed by one or more embodiments of the present invention.

Additional advantages and novel features of this invention shall be set forth in part in the description that follows, and in part will become apparent to those skilled in the art upon examination of the following specification or may be learned by the practice of the invention. The advantages of the invention may be realized and attained by means of the instrumentalities, combinations, compositions, and methods particularly pointed out in the appended claims.

SUMMARY OF THE INVENTION

Disclosed is a system for geolocation in austere environments where a Location Processing Engine (LPE) is configured to respond to first responder User Biometric Data (UBD) and locational information—either of which has degraded below a predetermined limit—by modifying dwell time assignments (defined below as "comm windows") to increase confidence in the FR's Individual GeoLocation Unit (IGLU) location (IL). Such a system can include, in one embodiment, one or more anchors having at least one UWB transceiver as well as a GNSS receiver configured to determine an Anchor Location (AL). It can also include at least one IGLU, associated with a user (i.e., an FR), that has a UWB transceiver that can provide two-way ranging to anchors positioned around the austere environment. Each IGLU includes accelerometers configured to measure the motion of the user, and a Biometric Monitoring Unit (BMU) configured to measure UBD. Finally, the system includes a base station communicatively coupled to each anchor and/or each IGLU in a localized network bounded by the anchors. The LPE resides in the base station and the base station also includes a UWB transceiver which receives IGLU data from each IGLU, either directly from each IGLU or relayed through one or more anchors. The LPE determines an IL based on received IGLU data and assigns periodic dwell time as a function of the UBD and LPE confidence in the IL.

Each IGLU is configured to transmit, using at least one UWB transmitter, IGLU data using one or more data packets. Each IGLU also relays the IL of other IGLUs to the base station and/or to one or more anchors. The base station determines IL using MLAT of received IGLU data and GNSS data of each anchor. The LPE is then configured to respond to IL falling below predetermined limits, based on UBD or IL confidence, to modify dwell time assignments.

The method used for geolocation of a user in austere environments comprises establishing a local geolocation network by one or more Anchors wherein each anchor is associated with an AL, and each anchor includes at least one UWB transceiver and a GNSS receiver. One of the anchors is configured as a base station having an LPE, which is associated with the users IGLU. Each IGLU includes at least one UWB transceiver configured to provide two-way ranging, a plurality of accelerometers configured to measure the motion of the user, and a Biometric Monitoring Unit (BMU) configured to measure User Biometric Data (UBD) of the user. Using MLAT of received IGLU UWB data and the UWB and GNSS data of each anchor, as well as the IGLU data itself, the base station determines the IGLU's location (IL) and establishes a periodic dwell time based on indicated distress levels and LPE confidence in the IL.

In another version of the present invention, a non-transitory, machine-readable storage medium stores instruction for personnel geolocation in an austere environment. Such a medium includes machine-executable code that, when executed by at least one machine, causes the machine to associate with each user, an IGLU which has at least one UWB transceiver configured to provide two-way ranging. Each IGLU also includes a plurality of accelerometers configured to measure the motion of the user, and a Biometric Monitoring Unit (BMU) configured to measure UBD of the user. Additional code directs the base station to receive IGLU data and thereafter determine an IGLU location (IL) based on the received IGLU data. The LPE of the base station executes code to determine a LPE confidence in the IL, and assign a periodic dwell time as a function of the UBD and LPE confidence in the IL. Additional code causes the IGLU to transmit IGLU data contained within one or more data packets. Anchors are directed to relay this information to the base station which thereafter uses MLAT of the UWB and GNSS data of each anchor to determine a location of the IGLU.

The features and advantages described in this disclosure and in the following detailed description are not all-inclusive. Many additional features and advantages will be apparent to one of ordinary skill in the relevant art in view of the drawings, specification, and claims hereof. Moreover, it should be noted that the language used in the specification has been principally selected for readability and instructional purposes and may not have been selected to delineate or circumscribe the inventive subject matter; reference to the claims is necessary to determine such inventive subject matter.

BRIEF DESCRIPTION OF THE DRAWINGS

The features of the present invention and the manner of attaining them will become more apparent and the invention itself will be best understood by reference to the following description of one or more embodiments, taken in conjunction with the accompanying drawings.

Figure 1:
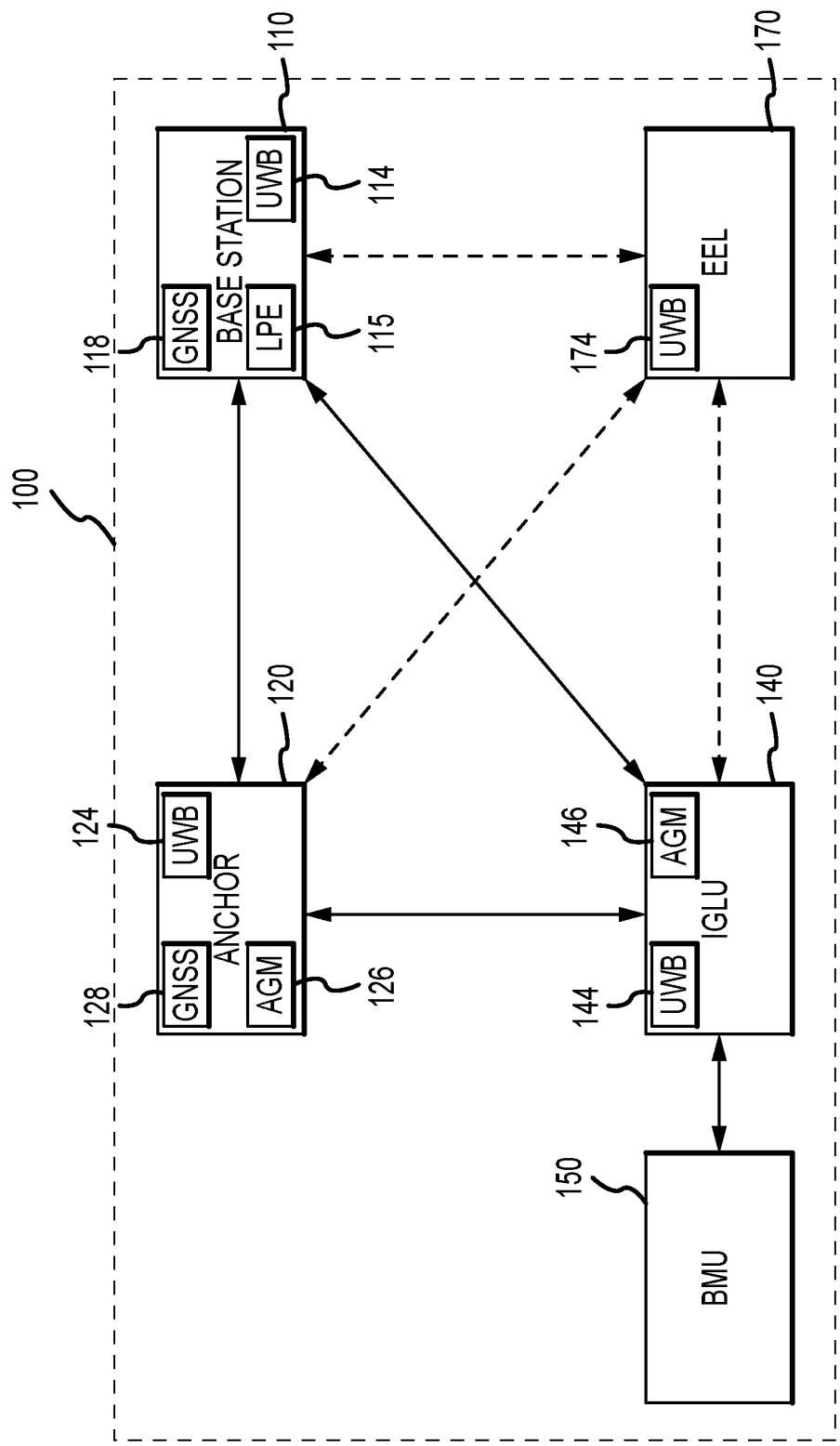
FIG. 1 shows a high-level system architecture for a personnel location and monitoring system, according to one embodiment of the present invention.

The Figures depict embodiments of the present invention for purposes of illustration only. One skilled in the art will readily recognize from the following discussion that alternative embodiments of the structures and methods illustrated herein may be employed without departing from the principles of the invention described herein.

DESCRIPTION OF THE INVENTION

A system, and its associated methodology, provides personnel location and monitoring capability to OSCs in austere environments. The present invention establishes a localized network of geolocation capable transceivers around an austere environment which can thereafter provide communication (datalink) capabilities with specially-equipped users (FRs) as they ingress and egress an austere environment. The localized network of the present invention is formed from a plurality of transceivers hereinafter referred to as anchors, one of which is designated as a base station. Each anchor, including the base station, includes, among other things as described below, a GPS receiver and one or more UWB transceivers.

Each user (an FR, in one embodiment) is equipped with an IGLU which provides data via a datalink capability with one or more of the anchors, and ultimately with the base station. From such data and the datalink itself the location of the user and that user's biomedical condition can be ascertained. The IGLU communicates with the base station, either directly or through an anchor, enabling the base station to monitor the physical condition of the user and the user's location. As confidence of the location of the user drops below a predetermined threshold and/or the biomedical condition of the user raises concern for the user's wellbeing, the present invention modifies the communication and geolocation protocols to prioritize communication and data transfer with the user's IGLU.

Embodiments of the present invention are described below in detail, referencing the accompanying Figures. Although the invention has been described and illustrated with a certain degree of particularity, it is understood that the present disclosure has been made only by way of example and that numerous changes in the combination and arrangement of parts can be resorted to by those skilled in the art without departing from the spirit and scope of the invention.

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Like numbers refer to like elements throughout. In the figures, the sizes of certain lines, layers, components, elements or features may be exaggerated for clarity.

The terminology used herein is for the purpose of describing particular embodiments only and is not intended to be limiting of the invention. As used herein, the singular forms "a," "an" and "the" are intended to include the plural forms as well, unless the context clearly indicates otherwise. Thus, for example, reference to "a component surface" includes reference to one or more of such surfaces.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

As used in this discussion, "UWB" is a radio frequency (RF) technology using extremely short-duration RF energy pulses. The extremely short-duration pulses in the time domain translate to a very wide frequency-domain spectrum (typically more than 1 GHz wide). The technology can be used for communications, radar and ranging/location applications. UWB systems transmit signals across a much wider frequency than conventional systems and are well suited to use in environments such as automobiles and buildings, because of their very compact size, fine spatial resolution, extraction of target feature characteristics, low probability of interception and non-interfering signal waveform—all of which make UWB systems appealing to such applications.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

It will be also understood that when an element is referred to as being "on," "attached" to, "connected" to, "coupled" with, "contacting", "mounted" etc., another element, it can be directly on, attached to, connected to, coupled with or contacting the other element or intervening elements may also be present. In contrast, when an element is referred to as being, for example, "directly on," "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under," "below," "lower," "over," "upper" and the like, may be used herein for ease of description to describe one element or feature's relationship to another element(s) or feature(s) as illustrated in the figures. It will be understood that the spatially relative terms are intended to encompass different orientations of a device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of "over" and "under". The device may be otherwise oriented (rotated 90 degrees or at other orientations) and the spatially relative descriptors used herein interpreted accordingly. Similarly, the terms "upwardly," "downwardly," "vertical," "horizontal" and the like are used herein for the purpose of explanation only unless specifically indicated otherwise.

FIG. 1 presents a high-level system depiction of a personnel locational and monitoring system 100. According to one embodiment of the present invention, a FR locational and monitoring system 100 increases situational awareness at all levels of a FR incident scene, from the individual FR to command and control levels. For purposes of the present invention, the term "incident" is understood to mean any event requiring FR response, and the event includes the period during which the FR is on-scene and the system of the present invention is active. Further, the term "incident scene" is understood to mean any incident setting in which a FR is needed. The system of the present invention further provides a digital record of each incident, enabling digital reconstruction of the incident (or set of incidents) for training or individual/group assessment.

One embodiment of the present invention is comprised of several networked components. One component, referred to herein as a "base station" 116, includes a Location Processing Engine (LPE) 115—that is, a micro-form-factor PC or other capable processor, a non-transitory storage medium (which provides, among other things, local storage of incident telemetry as well as storage of a prioritized rule set used to assign communication priorities within the system's network)—combined with an application programming interface (API) application, and a router (that is, a commercial, stand-alone router), as well as at least one UWB transceiver 114 and at least one GNSS 118 receiver.

Another component, an "anchor" 120, provides a static reference point for MLAT calculations. The anchor is a mobile, deployable, static reference and communication/navigation ("comm/nav") point deployed by FR personnel during initial on-site incident assessment. In one embodiment, each anchor has a processor (not shown) on board and provides external communications via a UWB transceiver 124, along with GNSS-assisted positioning from an on-board GNSS receiver 128 and on-board memory. Each anchor also includes a 9-degree-of-freedom (9D) accelerometer/gyroscope/magnetometer (AGM) 126 for inertial measurements (the term, "9D", derives from accelerometer measurements of position [in three dimensions], gyroscopic attitude measurements [object orientation in three dimensions] and geomagnetic sensor measurements of the Earth's magnetic field [again, in three-dimensional space]). Each anchor is, in one embodiment, supplied by a 3200-milliamp-hour (3.2K mAh) battery providing approximately 8 hours of continuous active run-time, and each 3.2K mAh battery uses built-in inductive charging according to the "Qi" Wireless Power Consortium standard (the standard abbreviated in this document as, "Qi-WPC"). The anchor has a durable weather-resistant casing whose firmware is capable of being updated by over-the-air (OTA) updating through UWB transmissions. MLAT positioning fidelity increases as more anchors are deployed. In one embodiment of the present invention the base station is a specially equipped anchor. In other embodiments the base station is a more capable centrally located component that interaction with and manages the deployed anchors to form the localized network.

Another component in this system is an Individual Geospatial Locating Unit (IGLU) 140. An IGLU is worn by each FR during incident response. Each IGLU transmits the geolocation and biometric information of the individual, IGLU-equipped FR. According to one embodiment of the invention, each IGLU provides external communications via UWB transceivers 144 (as well as to its associated Biometric Monitoring Unit (BMU) 150, via a Bluetooth link, as detailed below). Each IGLU 140 further employs an AGM 146 for accelerometer-derived position determination (relative 3D-positioning updates) using the internal motion sensors of the AGM, and each IGLU sources power from a 2000-mAh (2K mAh) battery holding approximately 8 hours continuous active run-time. Finally, each IGLU is paired to and retrieves and reports biometric telemetry from its associated BMU via Bluetooth.

The BMU 150, like the anchor 120, IGLU 140 and EEL 170 (the EEL will be discussed below) has a durable, heat & weather-resistant casing and uses Atmel architecture. The BMU 150 communicates with the IGLU 140 via a Bluetooth communication link and has, in one embodiment, an on-board 32 KB FRAM. Like the IGLU 140, anchor 120 and EEL 170, the BMU 150 is OTA-firmware-update-capable. Further, the BMU 150 has built-in inductive charging (Qi-WPC) and contains a high-resolution infrared oximeter and pulse sensor, as well as a 500-mAh battery which provides a continuous, active run-time of approximately 8 hours. The BMU 150 is worn with the IGLU 140 by FR personnel during incident response and the primary function of the BMU is to report biometric (biomedical) telemetry via Bluetooth to the associated IGLU for UWB relay, ultimately, to the base station.

In another embodiment and as alluded to above, an optional component of the present invention is a comm/nav relay known as an EEL 170 ("EEL" is the acronym for "Emergency Egress Locator"). EELs provide additional static points of reference as well as additional comm/nav coverage (signal relay, or effectively, signal amplification), and are typically deployed by FRs during structure ingress. EELs are lightweight versions of anchors that can be deployed within a distressed structure (e.g., a building on fire) to provide additional static reference points for UWB ranging and communication. EELs do not, in this embodiment, contain AGMs or GPS receivers, but do contain at least one UWB transceiver 174. EELs also contain a consumable adhesive mount, enabling a FR to "slap" it onto any adhering surface, for ease in rapidly positioning the EEL during ingress (or as needed, when otherwise-denied-coverage areas become apparent). A FR would typically place an EEL in an area where diminished comm/nav capability would otherwise be expected to exist (e.g., due to debris, obstructions, deep FR penetrations into structures, etc.).

Although the invention has been described and illustrated with a certain degree of particularity, it is understood that the present disclosure has been made only by way of example and that numerous changes in the combination and arrangement of parts can be resorted to by those skilled in the art without departing from the spirit and scope of the invention.

Figure 2:
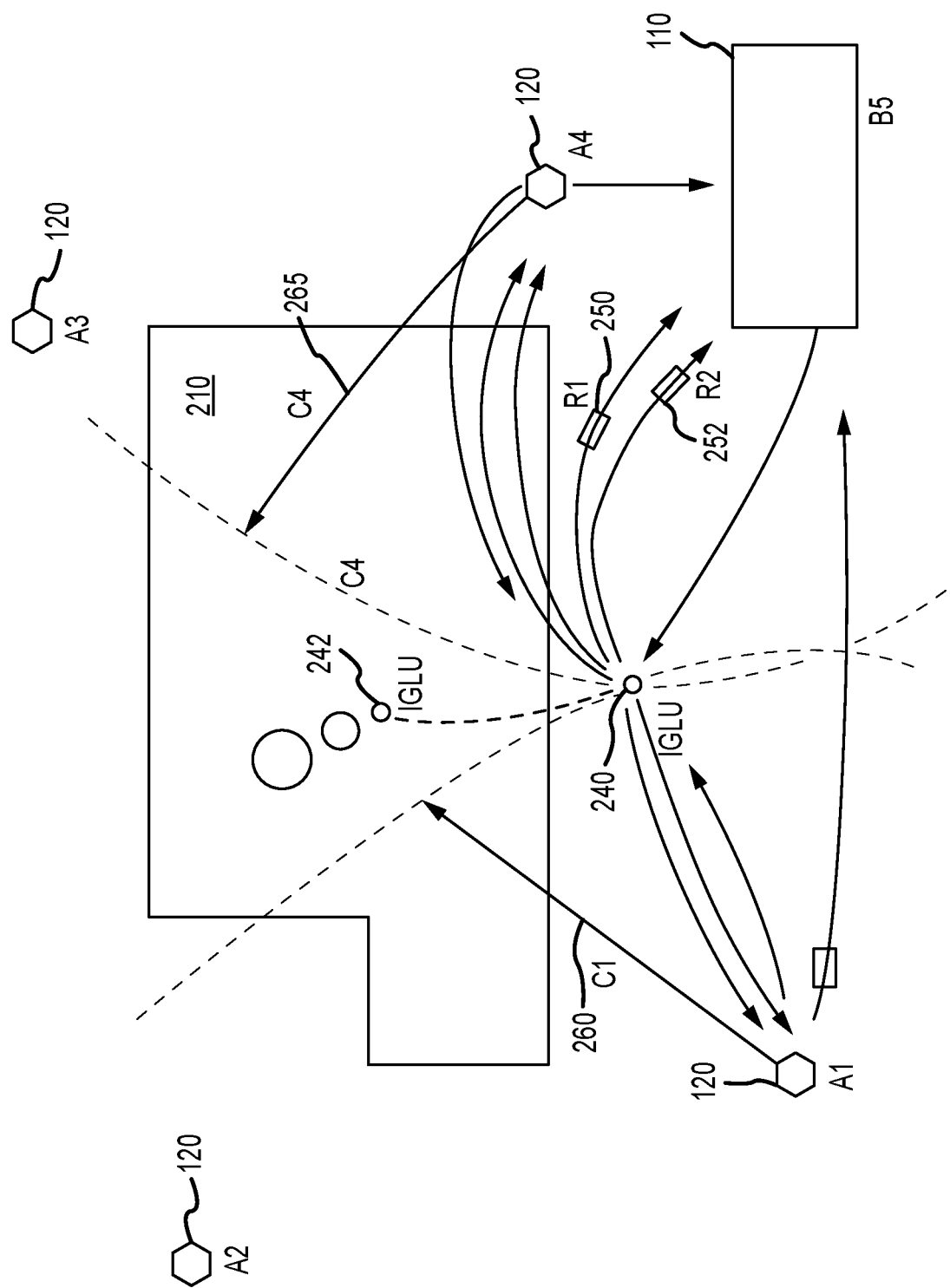
FIG. 2 represents a high-level depiction of a deployed scenario in which a system for personnel location and monitoring, according to the present invention, is implemented.

In one embodiment of the present invention and with additional reference to FIG. 2, the invention is deployed as a system upon arrival at an incident scene. For example, firefighters responding to a building fire would identify the building 210 and its immediate environs as an emergency response incident and establish a C2 perimeter around the incident area. While this particular example is an incident involving a building fire and an incident response by a fire-fighting team, one of reasonable skill in the relevant art will appreciate that the system and methodology presented in this example are applicable to a wide variety of situations and environments in which locating and monitoring FR personnel is important.

Location of each member of the responding team is maintained and monitored by the base station which, along with associated (i.e., registered) anchors, IGLUs and EELs (as needed), establish a local UWB network. FRs initially deploy a plurality of anchors 120 along a perimeter of the incident scene, with each anchor providing a different vantage of the structure. Ideally, the perimeter anchors surround the incident scene. Each anchor is positioned to be within line-of-sight of one or more other anchors and each anchor includes, in one embodiment, a plurality of UWB transceivers (in addition to the items detailed above). Each anchor provides a static, known location that can communicate via UWB comm/nav links to the base station as well as to one or more IGLUS 140 worn by the FRs.

Once the network has been established, the base station 110 constructs the communication window table for the network. "Communication window table" is understood to mean a table ("timetable") of time periods (or "comm windows"), with each comm window defined as the transmit/receive period allocated by the base station to a particular device (IGLU, anchor or EEL). Each UWB-capable device in the network is allocated a comm window during which the base station will transmit signals to and receive signals from that device.

Each FR carries an IGLU 240, 242 specifically identified with that individual. Each IGLU remains in a semi-dormant state until receipt of a base station 110 communication, after which the IGLU "wakes up" and performs device registration with the base station. Each IGLU 240, 242 also initializes communication with its associated BMU, via a dedicated Bluetooth-communication-standard ("Bluetooth") communication link, after which each BMU unit then also "wakes up" and begins its self-calibration process. Once the self-calibration process is completed, each BMU monitors, among other things, the heart rate and oxygen (02) saturation levels of the BMU's wearer. With registration complete, the base station 110 assigns a communication sequence slot (the above-referenced comm window) to each associated IGLU, EEL and anchor, as a function of the total number of UWB-capable units registered on the UWB network and the average time required to process the data packets received from each unit. As used in this document, the processing through each of these comm windows by the base station to exhaustion of the total number of comm windows assigned to devices registered on the network is termed a "cycle", and the base station continuously processes through these cycles while the system is operating. During the start of each cycle, the base station sends out a reference signal to synchronize the network-associated clock of each unit within the base station's local UWB network. During this cycle the base station also provides any additional information about new sequences or slots which have been issued (based upon the discovery of any new units which have arrived on-scene since the initial establishment of the communication window table). Each unit broadcasts any reportable data as well as any received reportable data or telemetry data from other units.

Each IGLU transmits its location via the UWB network to the base station, and the base station computes the IGLUS location by applying standard TDOA and TOF techniques to received signals from devices within the UWB network. A reference location is continually updated and maintained by each IGLU using the UWB signals and communicated back to the base station. The OSC can use this information to identify and locate each member of the incident response team from a central point of control.

Figure 3:
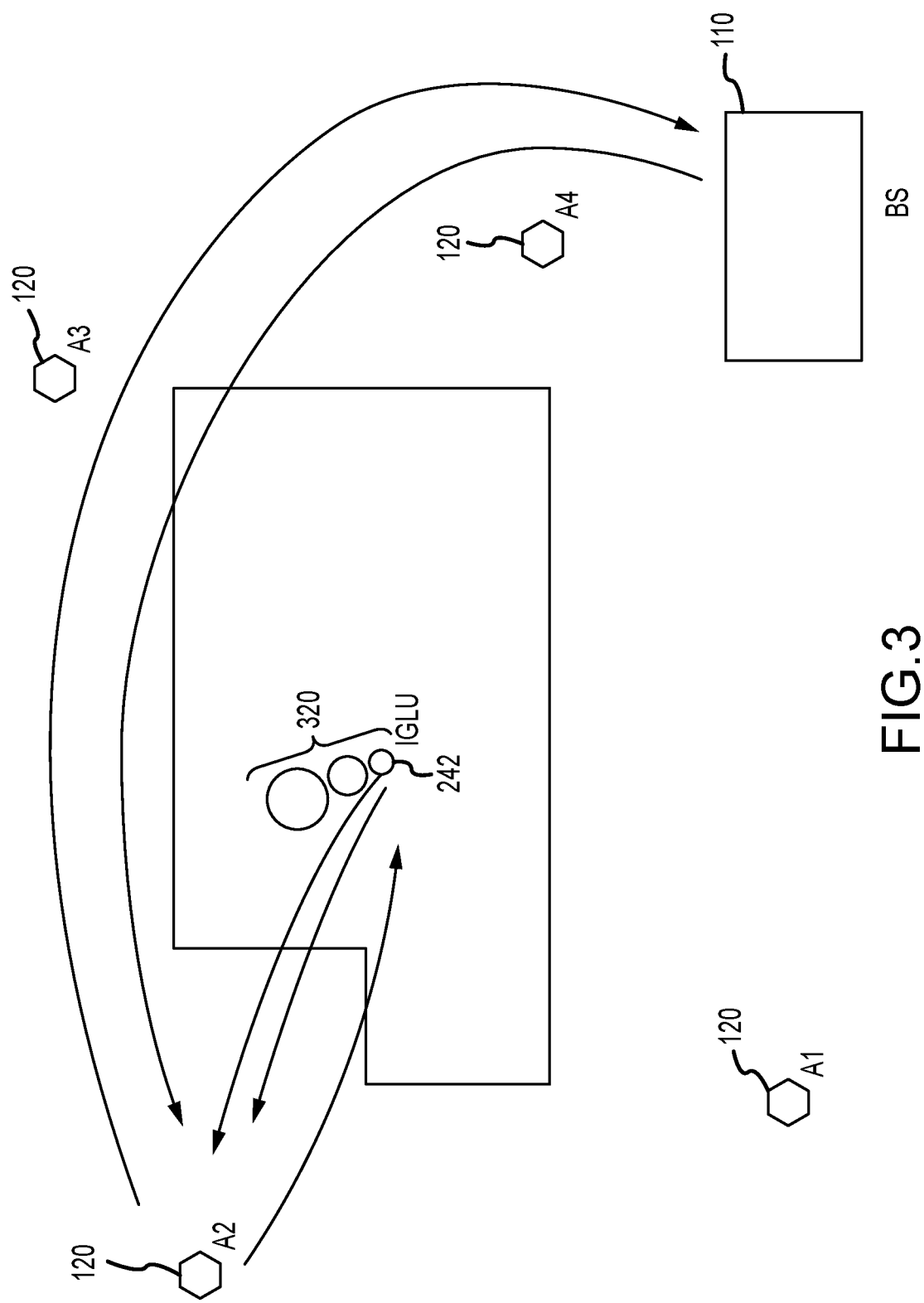
FIG. 3 represents a high-level depiction of a deployed scenario in which the resilient, adaptive communication feature of the present invention, is implemented.
Figure 4A:
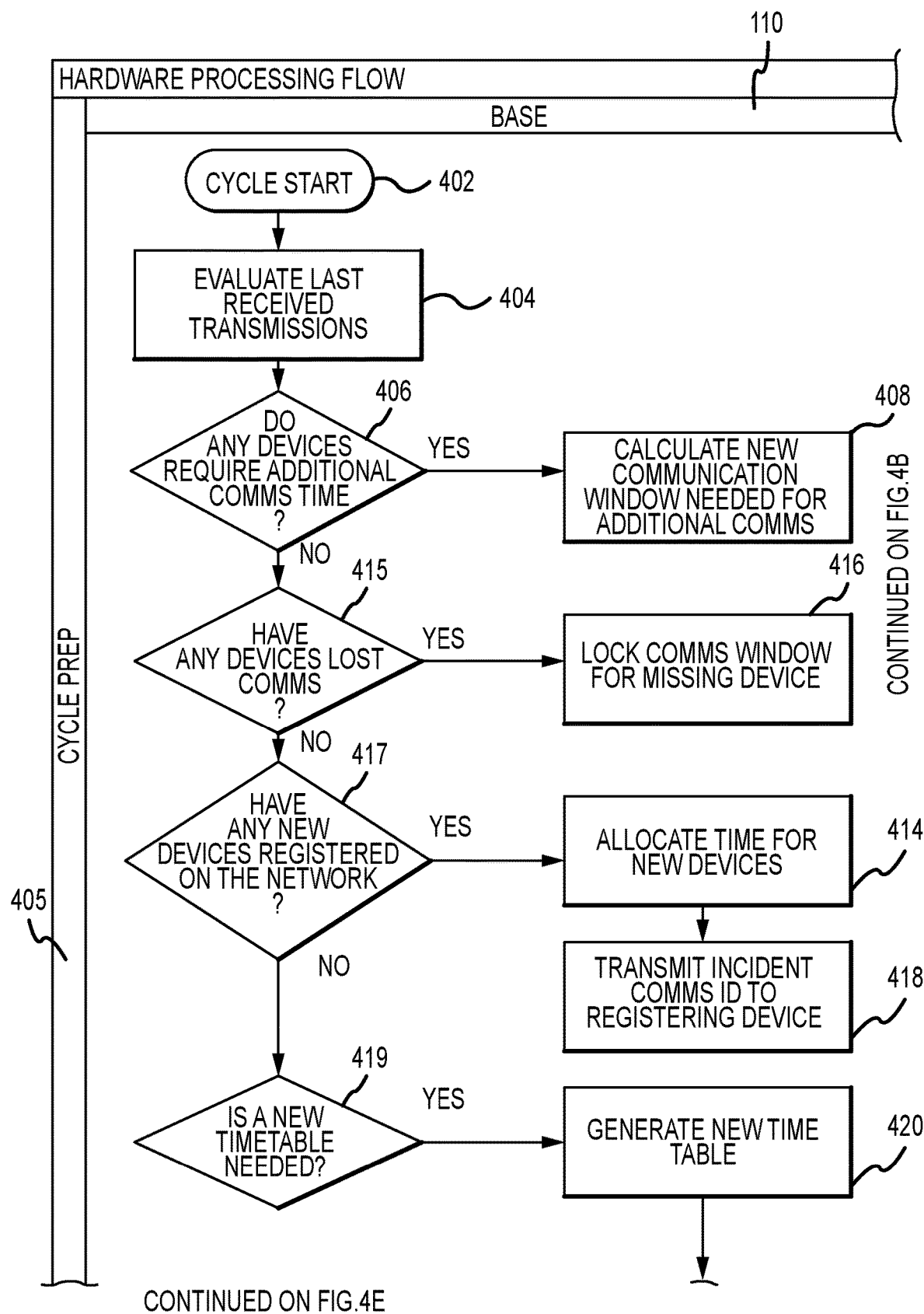
FIGS. 4A-4L present a flowchart of communication protocols between various components of a system for personnel location and monitoring, according to one embodiment of the present invention.
Figure 4B:
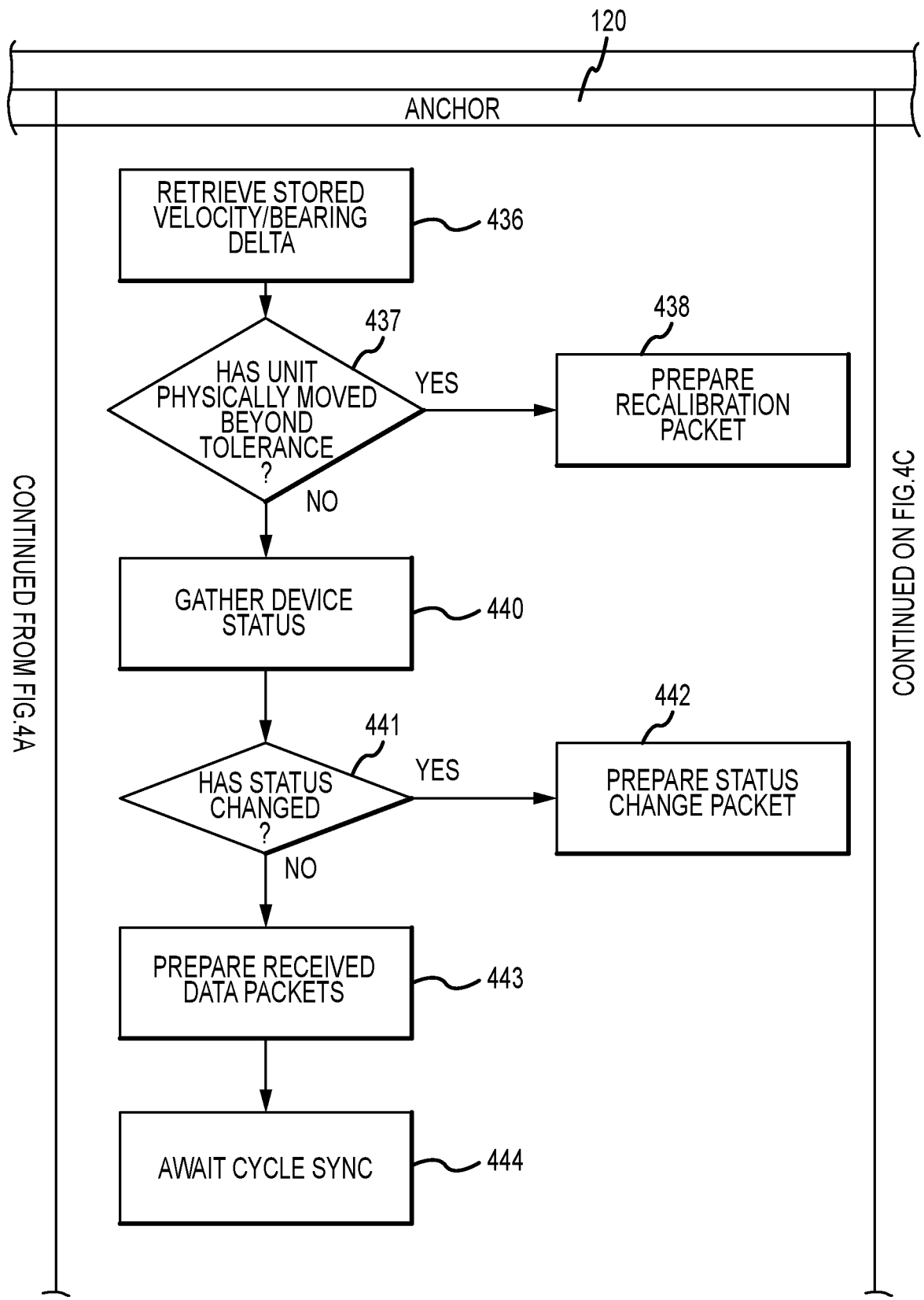
Figure 4C:
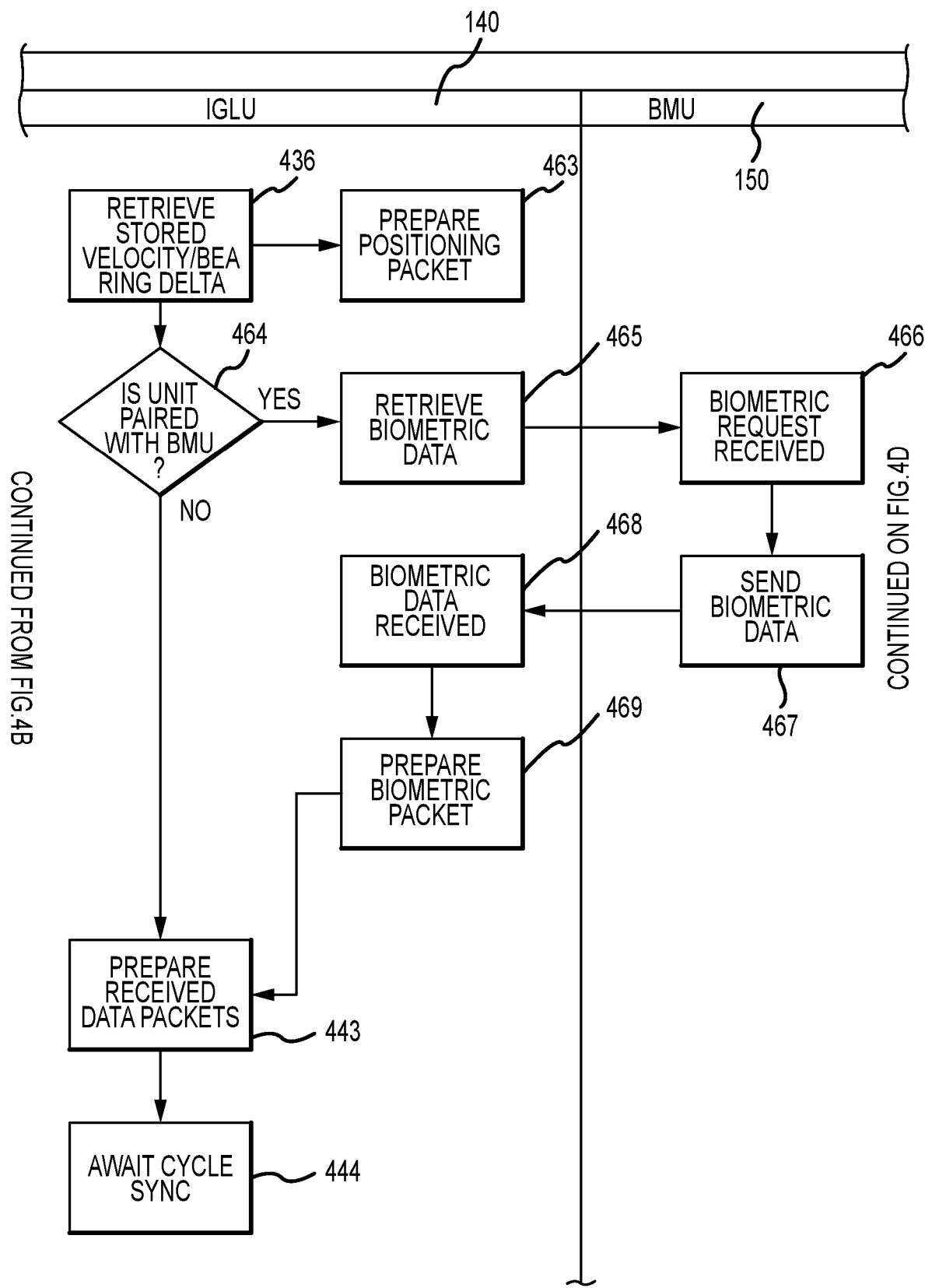
Figure 4D:
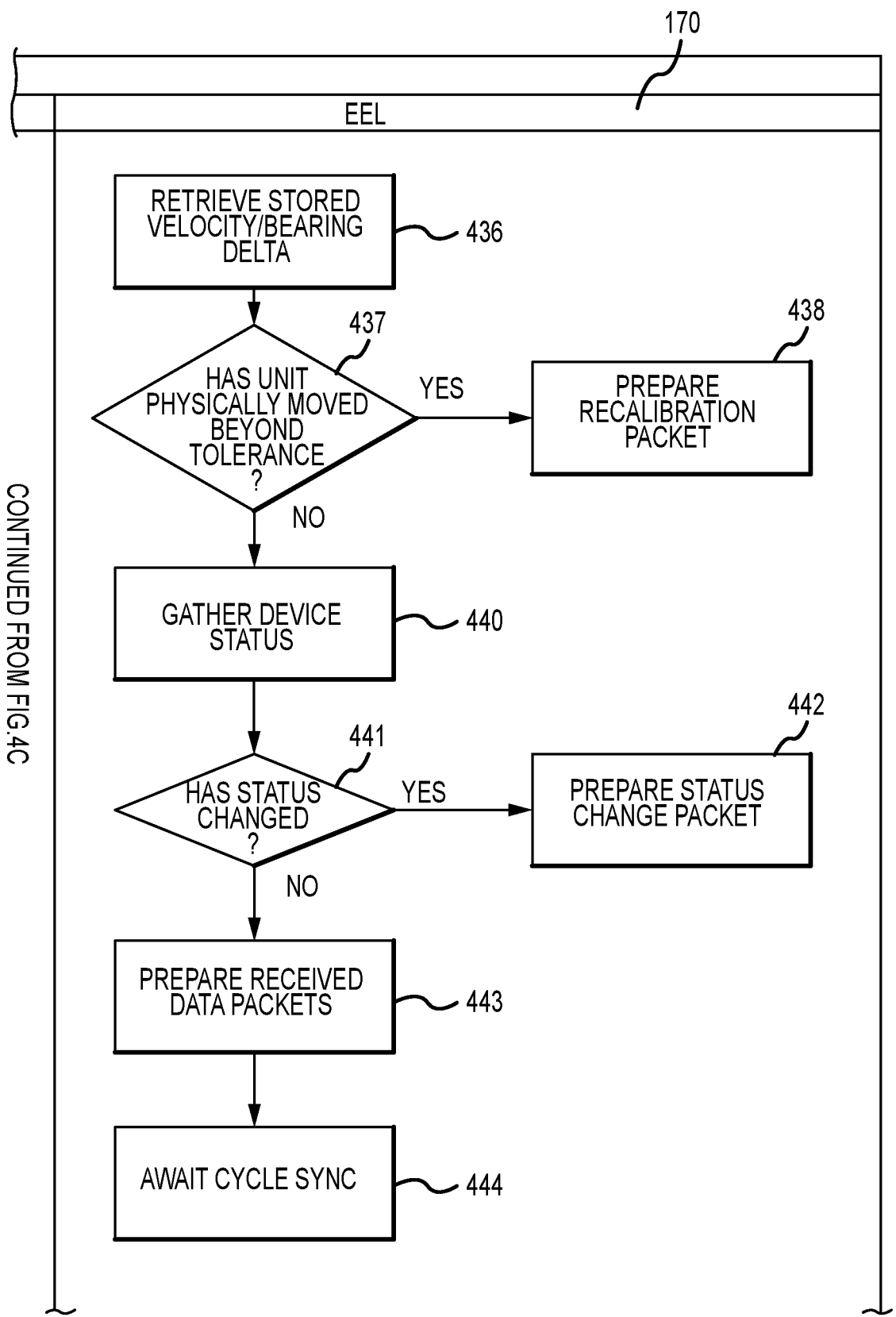
Figure 4E:
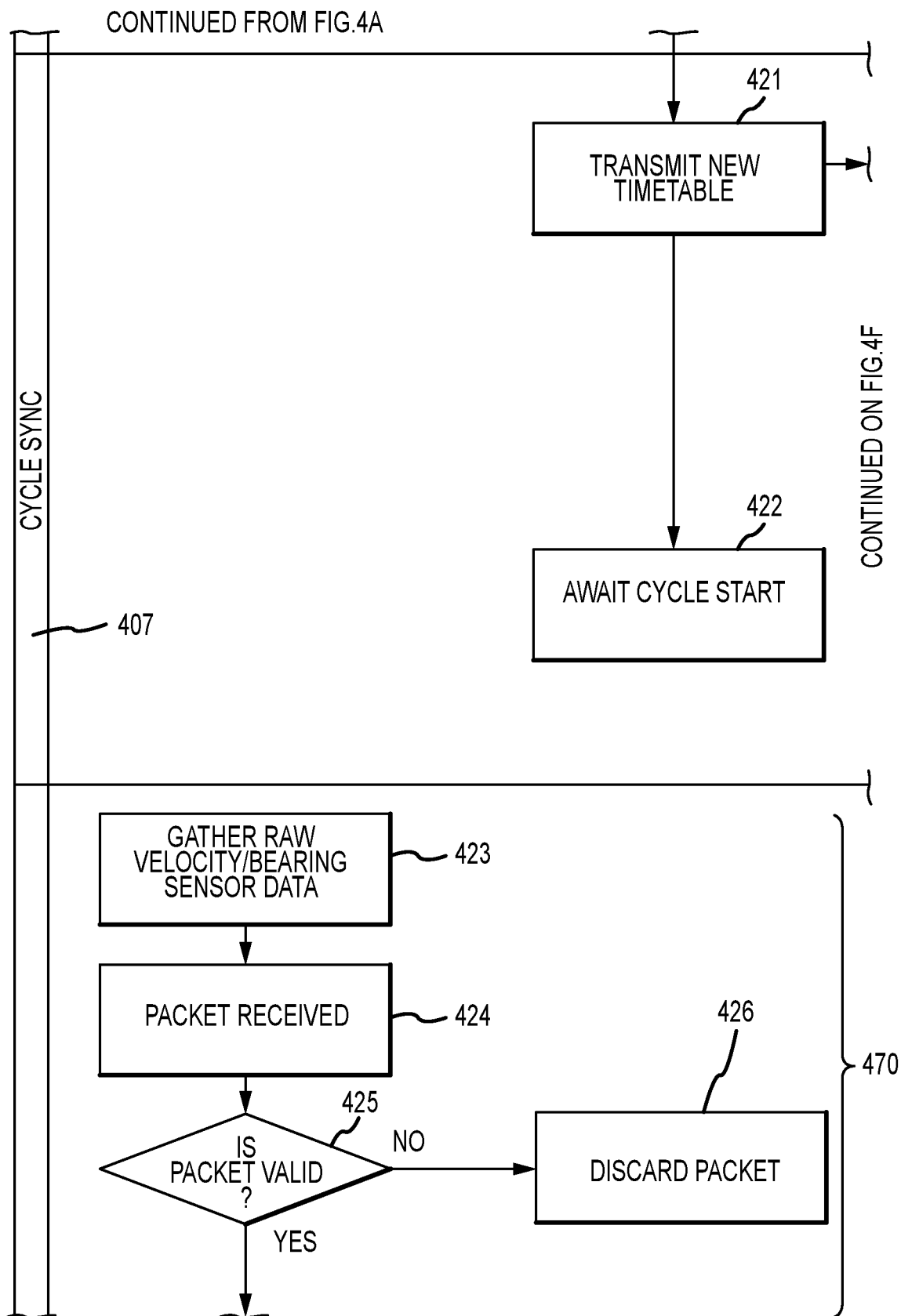
Figure 4F:
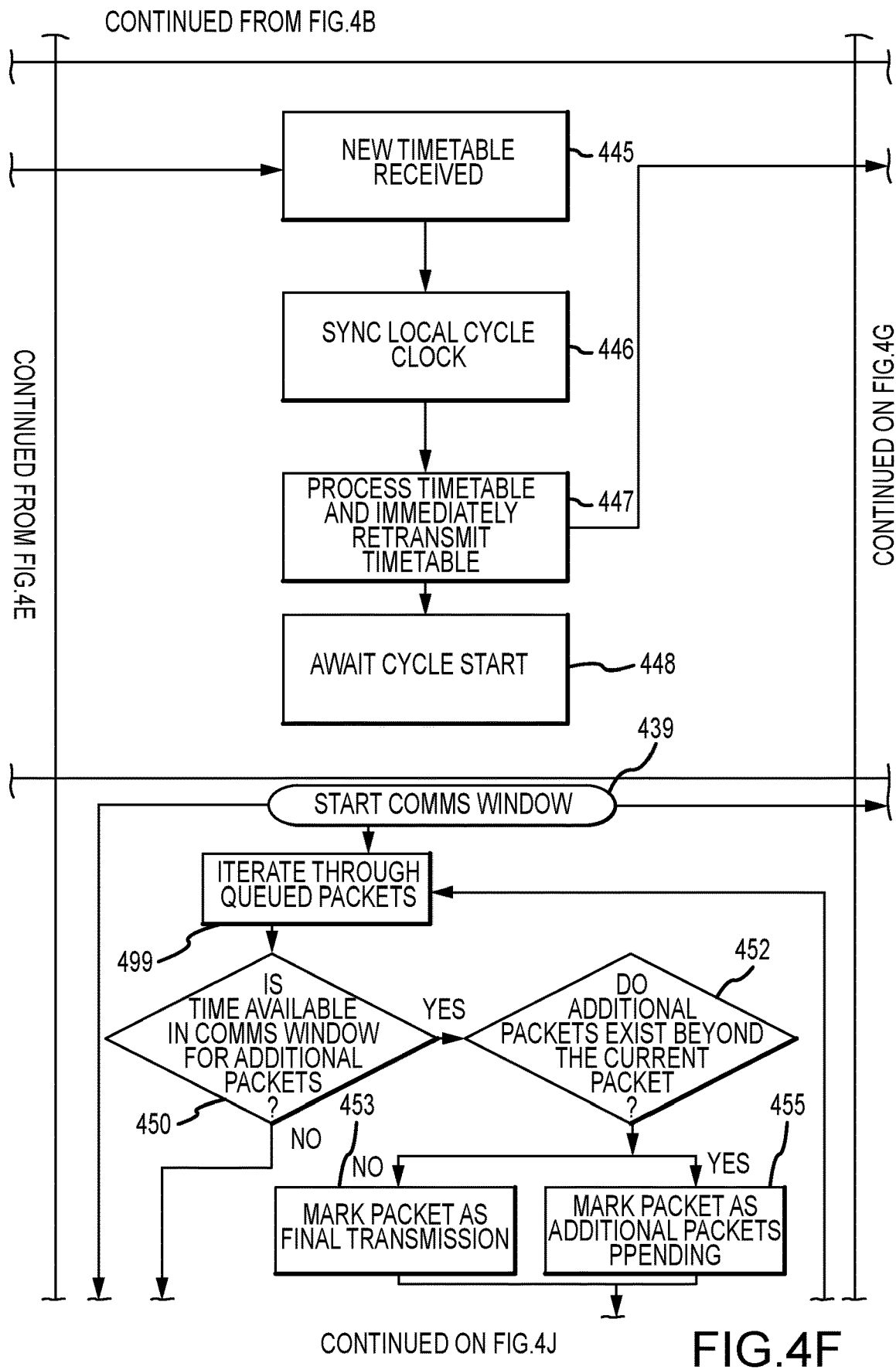
Figure 4G:
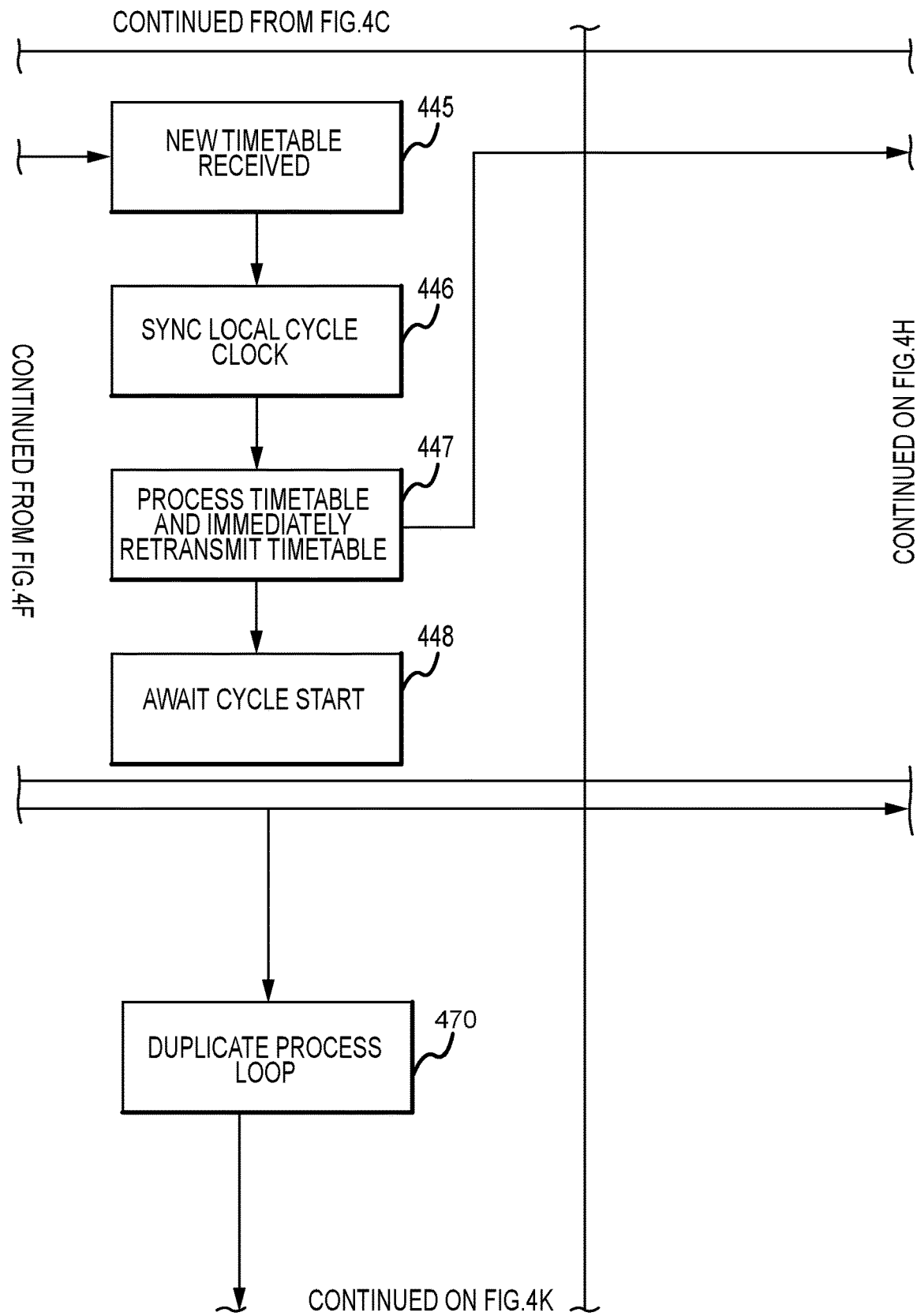
Figure 4H:
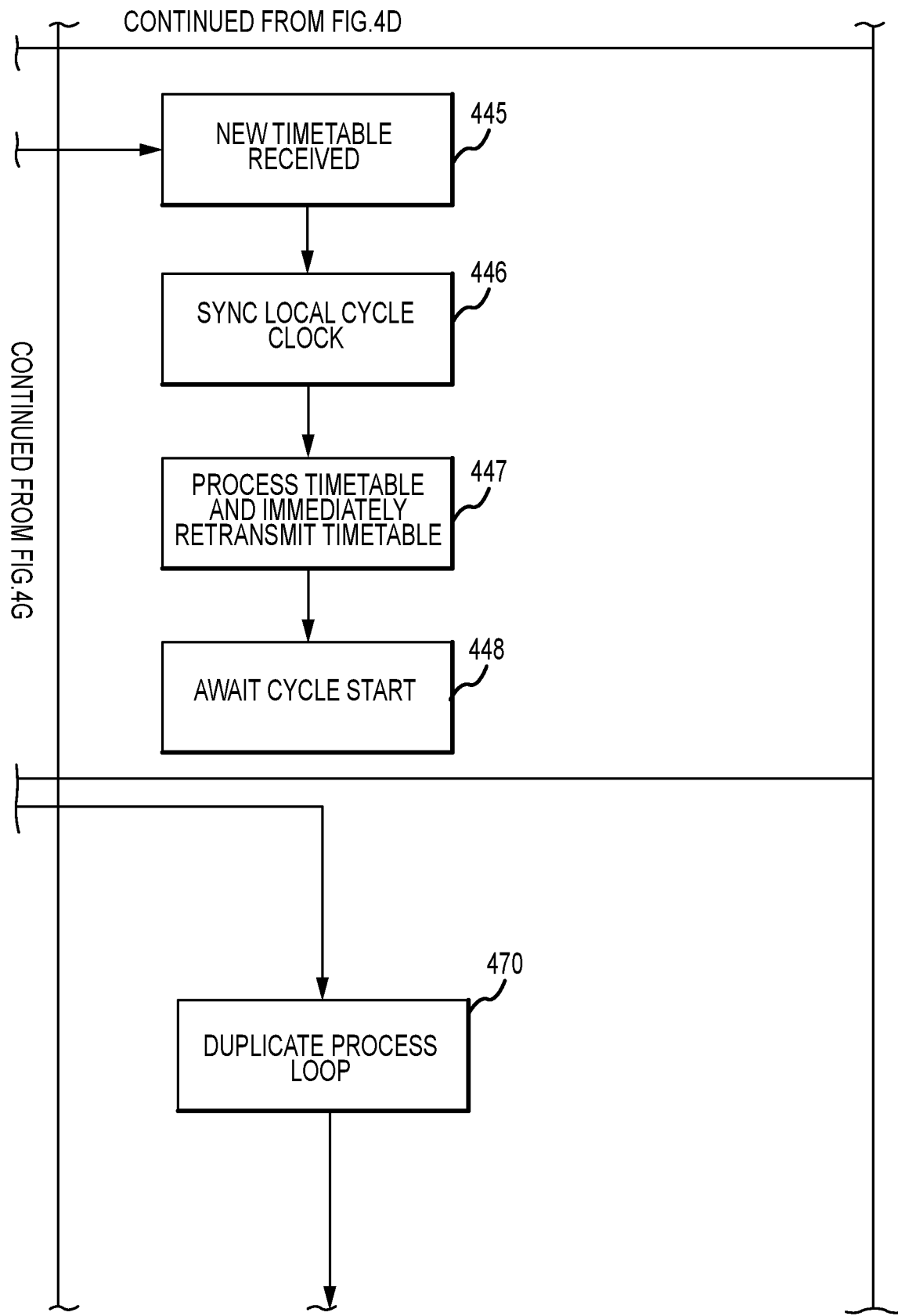
Figure 4I:
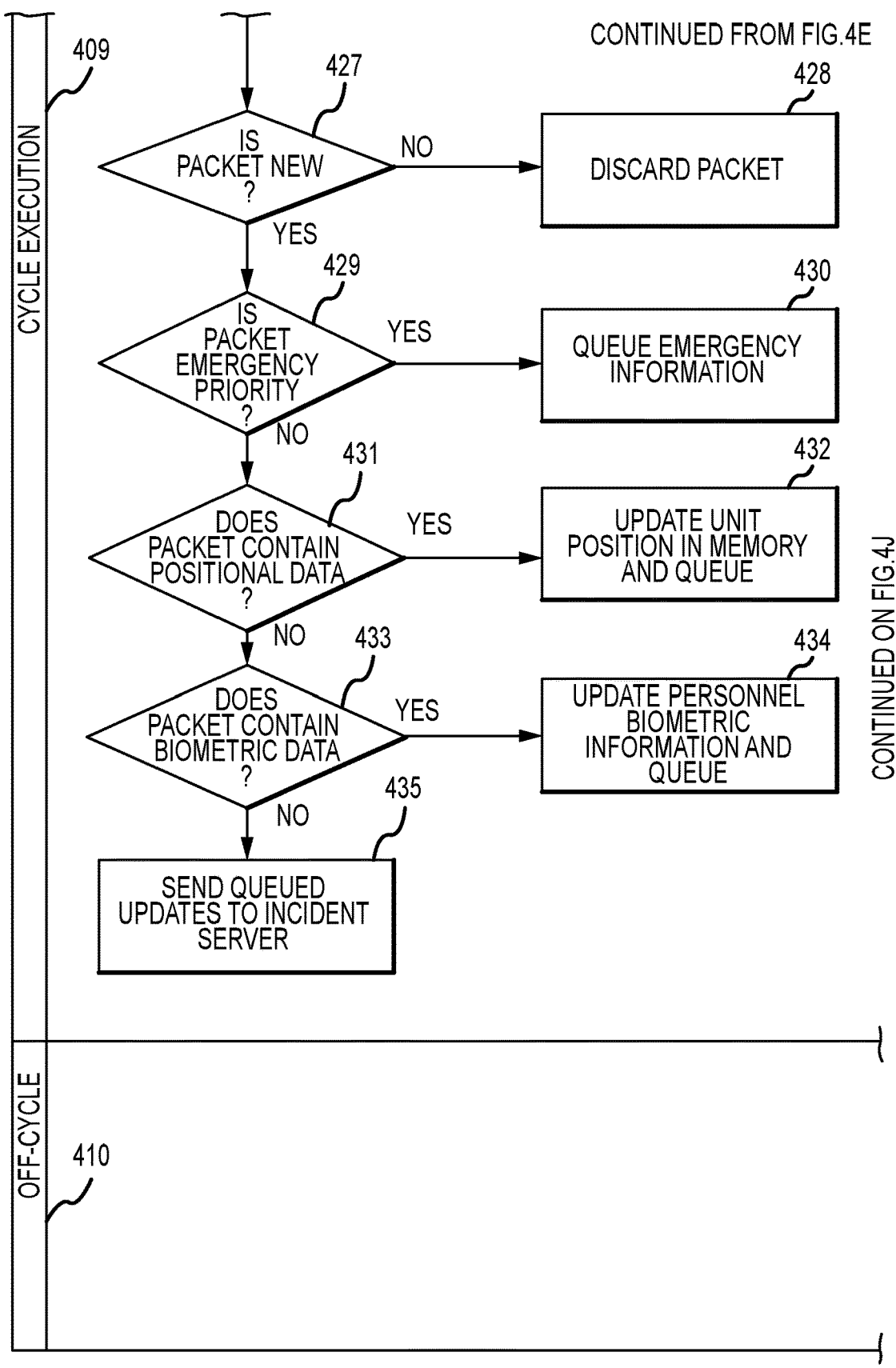
Figure 4J:
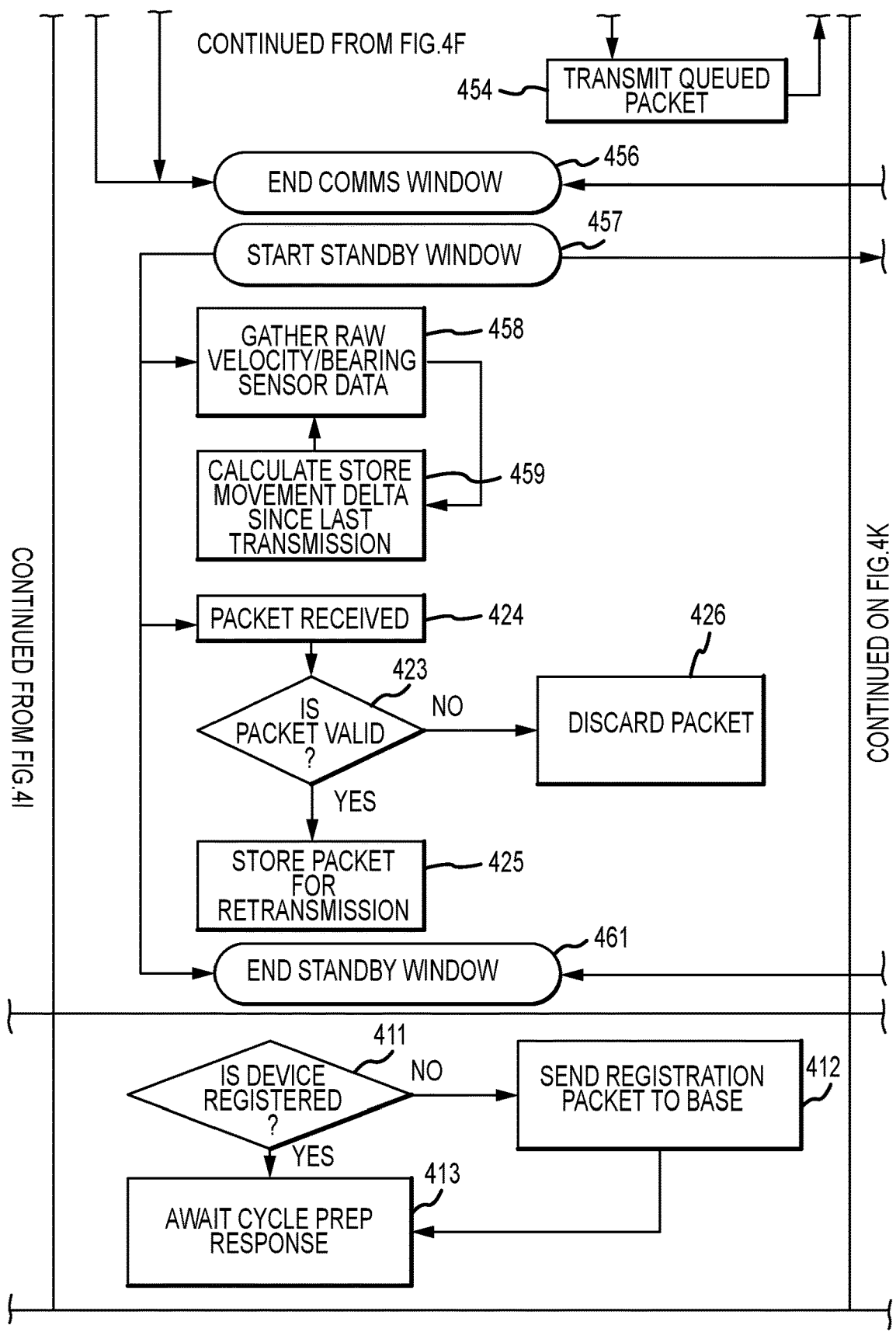
Figure 4K:
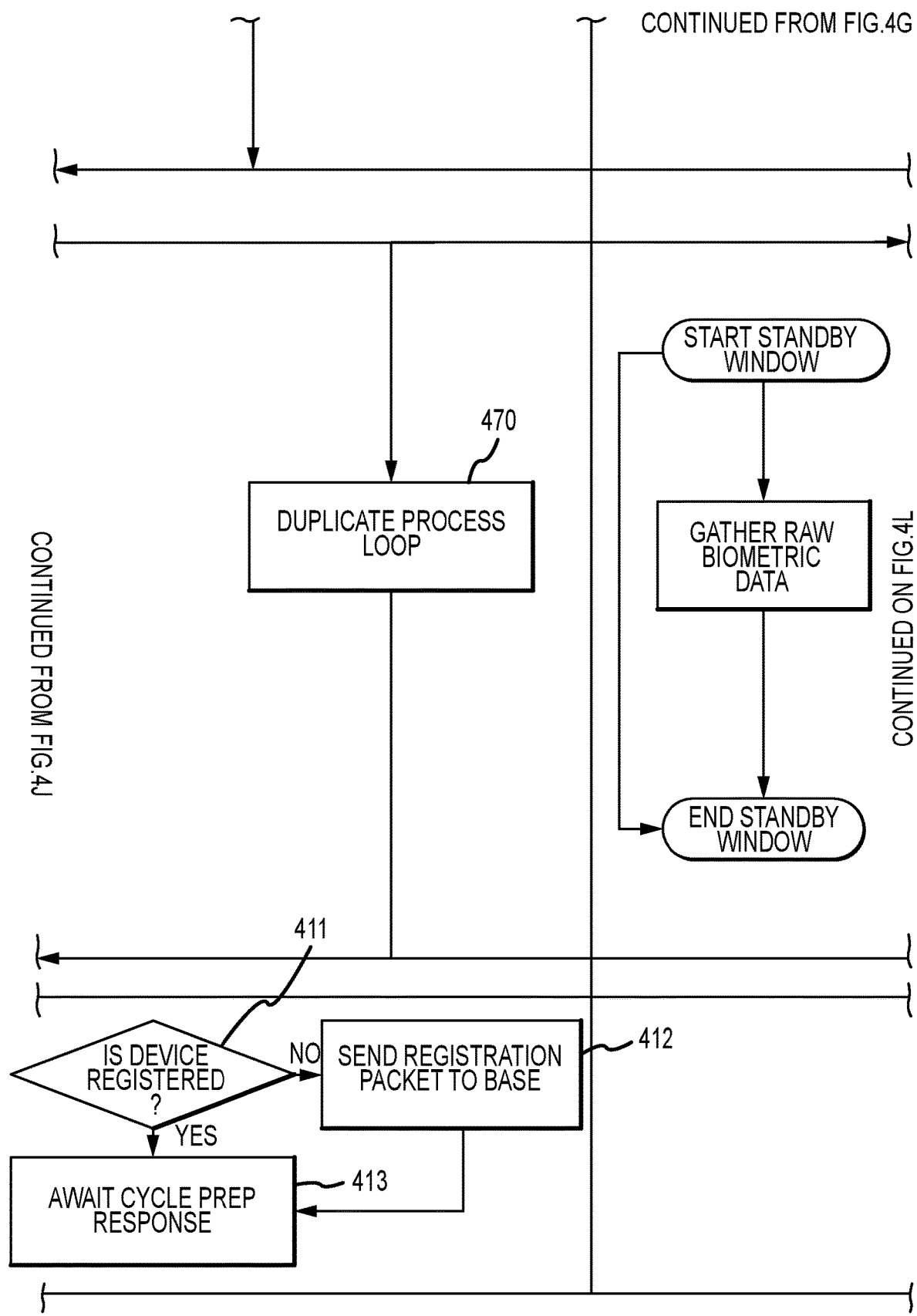
Figure 4L:
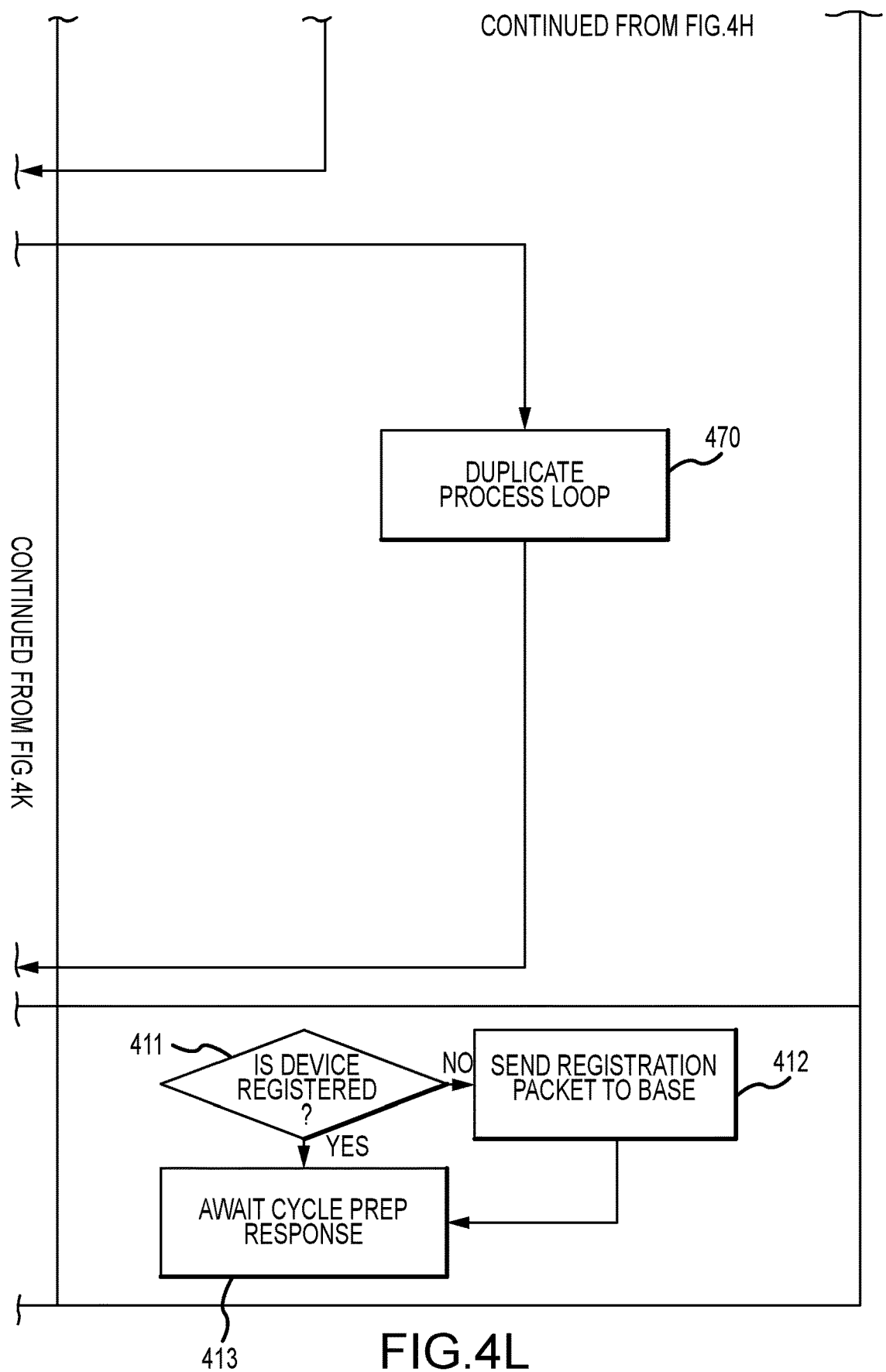

Referencing in addition FIG. 3, As FRs ingress into a structure RF signals may become degraded or attenuated, making UWB-based ranging and corresponding location 320 determination unreliable. While UWB-technology signals are less susceptible to degradation due to structural barriers (and hence are advantageous for use in the present invention), they nonetheless are still subject to environmental and/or structural factors and can become unreliable. The present invention thus merges inertial location data drawn from the IGLU's AGM with that of received UWB transmissions to dynamically update each IGLU's reference location within the base station, through its LPE. As UWB transmissions fade and become unreliable, AGM sensors are used to determine the IGLU's location based on inertial motion from the IGLU's last know location. Movements are tracked, and locations determined using the AGM's accelerometers, as detailed below. Upon receipt of a reliable UWB signal from one or more anchors 120, the accelerometer drift is corrected and the IGLU's location is reset. The constant signal strength and error analysis of UWB signals combined with accelerometer inertial calculations dynamically corrects and resets each IGLU's location within the structure.

According to one embodiment of the present invention, an algorithm is applied by the LPE during each cycle to measure the reliability of accelerometer data against TDOA/TOF-derived MLAT calculations from received UWB transmissions sent by the static UWB reference points (i.e., the anchors and EELs whose UWB transmissions have been received by the base station). The algorithm on the IGLU determines what additional information will be reported by the IGLU, in addition to its transmission "time stamp" (i.e., the IGLU's best estimate of the exact time the IGLU sends the transmission), to the base station. Each IGLU records and stores AGM data and its last-known location, as updated by the received base station UWB transmission. The base station weighs the IGLU's AGM data against MLAT calculations derived from available static UWB reference points, prioritizing the base station's reference of reliability.

In one embodiment of the present invention a linear-graded scale is used to assess signal reliability as the IGLU moves away from a given anchor point. In such an instance, the farther away the IGLU is from that anchor the less that anchor's data will be weighted in the determination of the IGLU's location. In related fashion, accelerometers—including those of the AGM—are known to possess certain "drift" (that is, inaccuracies in position, usually measured as velocities—for example, if an accelerometer has a drift of 1 kilometer per hour, in one hour the accelerometer-calculated position of an object will be 1 kilometer in error from the object's actual position) and can become unreliable after a period of time. The present invention, in one embodiment, uses a gradient scale based on the amount of time elapsed since the last verification-of-location transmission by the base station. The scale provides an uncertainty score for the AGM which is compared to that of the UWB uncertainty score to calculate a hybrid, "best estimate" position for the IGLU.

In environments in which UWB reception is questionable EELs can be deployed to provide additional UWB relay points. Each relay is a UWB transceiver positioned at a static, known location (as calculated by the base station), thus its positional data can be used to update an IGLU's location and also serve as a communication relay.

In one embodiment of the present invention, for example, MLAT methods are applied to UWB-generated signals to determine the relative position of a device. Positions of devices (anchors and IGLUs) containing AGMs are also updated by AGM measurements. These inertially-derived measurements are then algebraically summed to the last-received position acknowledgment from the base station to provide a current-position update as follows: Each AGM-containing device houses two registers. The first, "R1" 250, contains the last-received position acknowledgment from the base station. The second, "R2" 252, contains inertial measurements from the device's AGM, and these inertial measurements are constantly updated. During the associated comm window, each device (anchor/IGLU) transmits its R1 250 and R2 252 values, from which the base station computes a "new" R1 value and transmits the same, along with other data (as prioritized by the base station's prioritization algorithm), back to the device (either directly or through the UWB network). The device then overwrites its R1 with the new R1 value and "zeroes-out" (clears) its R2 values for the new acceleration coefficients that will be applied to the newly-received R1 value, in the same manner as previously described, continuing in this fashion throughout the operation of the system.

FIG. 2 shows a high-level, overhead overview of one embodiment of the invention, as a system operating with no anomalies in either communication or in position determination. Here, the system is set up upon arrival at an incident scene, which in this case is a distressed building. Anchors 120 A1, A2, A3 and A4 are positioned around the building 210 within line-of-sight of each other, and IGLU is outside the building, respectively. The base station 110 B5 is embodied as a fire truck equipped with the system-embodiment of the present invention.

As detailed earlier, when IGLU 240 "wakes up" (after being turned on), it first determines whether it is registered on the network. If it is not, it broadcasts a registration data packet to the base station, either directly or through the UWB network (i.e., as relayed through any available network-registered UWB device). Once IGLU has received an acknowledgment it is registered on the local UWB network, it then retrieves its stored velocity/bearing data and prepares a "positioning packet" for transmission through its UWB transceiver to any-and-all other available transceiver(s), including those on the base station. It next determines if it is paired to its BMU and if so, interrogates the BMU for biometric data, which the BMU sends to IGLU across its paired Bluetooth link. It then prepares these two data packets (BMU data and positional [R1 & R2] data) to be sent as a single data packet during IGLU's comm window.

After the data retrieval and preparation described immediately above, IGLU must then "sync up" to the "new" timetable transmitted by the base station across the UWB network (the timetable's calculation is discussed above). Upon reception of the timetable, IGLU synchronizes its local clock to that of the network (the network's reference-clock signal is established and broadcast by the base station), then processes and stores the timetable internally, then retransmits the timetable across the UWB network and awaits the start of its comm window.

During the timetable's cycle, IGLU—like every UWB-equipped device in the network (i.e., anchors, EELs and IGLUs)—transmits and receives in its comm window and has a "standby window" during which it performs other tasks, outside the comm window. At the start of IGLU's comm window, IGLU determines whether any existing data packets remain from the end of the last comm window to transmit and, if so, it queues them for transmission ahead of the current packets, so that through iterations of comm windows all packets in IGLU's packet-queueing are eventually transmitted.

In contrast, during IGLU's standby window it gathers raw velocity/bearing sensor data (from its AGM) and calculates and stores its movement differential (R2) since its last acknowledged (from the base station) position (R1) transmission. It then examines any data packets received from the base station (including, but not limited to, the base station's LPE-computed last-position of IGLU) and the other UWB-equipped devices, storing valid packets and discarding the rest. If a new R1 value is received in the received data packets, it replaces the old R1 and R2 is simultaneously reset to zero movement-differential from the new R1 value.

No positioning calculations are performed outside the LPE, which processes TDOA/TOF values from all received data packets using conventional MLAT methods to determine device locations. Each device precisely "time-stamps" its data when it sends a data packet, and since electromagnetic signals travel at the speed of light, simple time-rate-distance calculations can provide the LPE information from the various devices using these MLAT methods to determine each device's position. The base station, thus, does not only receive data packets from UWB-equipped devices on its network, but the signal sending the data packet is used itself for ranging. For instance, in FIGS. 2, A1 120 and A4 120 both receive time-stamped data-packet transmissions from IGLU 240. Each anchor then "stamps" its own time on its data packet transmission, and forwards IGLU's data packet with its transmission. The base station's 110 LPE then processes all data packets to determine positions. Here, for instance, the LPE "knows", based on knowing A1's and A4's absolute positions (in a manner similar to this discussion) and the difference between the time IGLU's data was transmitted and the time it arrived at A1, IGLU 290 must lie somewhere on C1 260, the circumference formed by the constant-length distance IGLU must be from A1. In similar fashion, IGLU 240 must lie on C4 265, with respect to A4.

Using such MLAT techniques, IGLU can be found at the intersection of the intersecting arcs of the circumferences of each such circle from each device receiving a valid data packet from IGLU, assuming each such device then successfully transmits its own data packet along with that of IGLU to the base station, eventually. Here, "eventually" simply means the data packets could undergo many "relays" through other IGLUs, EELs or anchors before arriving at the base station for LPE position processing and determination.

In contrast, FIG. 3 is a high-level, overhead overview when communication (here, "communication" means communication via a UWB transceiver) or position-locating anomalies are introduced. In one embodiment of this invention, using the same configuration as in FIG. 2—A1-A4, the base station and IGLU—a communication and/or positioning problem has arisen. The two problems can of course be related, as in the case of a communication problem in which no communication is received from IGLU's UWB transceiver. In that case, a positioning problem will also arise, since the LPE will not have received updated positioning data from IGLU. But the problems can be distinct, as well.

In the case of a communication problem, if communication is lost between IGLU and the base station (either directly or as-relayed through an anchor, EEL or another IGLU) for more than a predetermined period of time, the base station will "lock" the comm window for IGLU so that even when the base station transmit a "new" timetable, IGLU's comm window is not adjusted. Moreover, after another predetermined period expires, the base station "rachets" that window open periodically, as a function of time, widening both sides of the IGLU comm window for increased dwell time for "listening" for UWB signals from IGLU, until the problem is alleviated (i.e., updated IGLU data arrives directly or through a relay to the base station).

In cases where a substantial amount of time has lapsed since communication (directly or indirectly) between the base station and IGLU, LPE position "confidence" 230 in IGLU's position will also attenuate (since this, too, is a function of time and based on predetermined thresholds of positioning confidence maintained by the LPE), thus a communication outage will eventually result in a position-confidence degradation within the LPE, as well.

The converse, however, is not true: A position-confidence problem does not of itself imply a communication problem. It is possible, for instance, for the LPE's composite confidence in both IGLU's AGM-derived position (R1, as updated by R2) and UWB-derived MLAT measurements that the LPE's position-confidence in IGLU's position drops below an acceptable threshold, even though it receives—via direct or relayed UWB transmissions—data packets from IGLU. This is especially true as more UWB links accrue through which IGLU's signal must be relayed. In this case, again, the comm window for IGLU will be locked based upon predetermined criteria so that better positioning data can potentially be gained by the base station and processed through the LPE, and IGLU's comm window will be ratcheted open as discussed above.

As discussed previously, UWB signals are inherently robust for communication within structures. UWB technology enables very high data rates, low power consumption and inherent resistance to structural and multipath impacts make such technology desirable for indoor-location applications. Even so, even UWB signals can become attenuated, degraded or distorted from environmental and/or structural impacts. Still FRs must be able to be located in such less-than-optimum conditions, which one embodiment of the present invention overcomes through its adaptive, resilient communication and positioning.

Returning to the above discussion about the functioning of UWB-equipped-device registers R1 and R2, FIG. 3 shows IGLU 242 in a building 210, but communication between the base station 110 and IGLU 242 has been lost. In this case, R1 will remain the "old" value last-received by IGLU from the base station, and R2 will continuously store positional "offsets" (three-dimensional displacement values from R1) as updated by continuously-fed AGM values. Unlike conventional MLAT requirements, in one embodiment of this invention only one UWB communication link (direct or indirect) is needed between IGLU and the base station. In that case, as long as IGLU can send and receive via the one UWB path (i.e. to and from a single UWB transceiver in the network, whether on the base station or otherwise), IGLU will transmit its R1 and R2 values as detailed above and the base station will return an updated R1 value to IGLU, which will update its R1 and "zero out" R2, as described above. Now, if sufficient time elapses, a predetermined tolerance threshold will again be reached in which the LPE's position-confidence in IGLU's position will deteriorate, triggering the comm-window-lockdown and ratchetting discussed above. Nonetheless, position-updating is available before such thresholds are reached, even though only a single UWB comm pathway exists between the base station and IGLU, and no other ranging-useful data is available from any other UWB-equipped network device.

FIGS. 4A-4L present a cycle-based flowchart, in one embodiment of the present invention's methodology. Bordering the left side of the flowchart and starting at the top are the phases of the cycle, labeled, "Cycle Prep" 405, "Cycle Sync" 407, "Cycle Execution" 409 and "Off-Cycle" 410. Upon power-up, each UWB-equipped system component will be in the "Off-Cycle" 410 mode ("Off Cycle") until registered on the UWB network with the base station. Each device will immediately determine whether it is registered 411 ("Is Device Registered?") and if not ("No"), the unregistered device will send 412 a registration packet to the base station ("Send Registration Packet to Base"), requesting network registration, and await 413 the base station's reply ("Await Cycle Prep Response"), which will occur during the "Cycle Prep" 405 ("Cycle Prep") phase, as next discussed.

Beginning with the base station, at the start 402 of the Cycle Prep phase ("Cycle Start" in "Cycle Prep" phase), the base station evaluates 404 the last received transmissions ("Evaluate Last Received Transmissions") using a predetermined, prioritized list of evaluation criteria (e.g., BMU data indicating degraded FR health, missed IGLU comm/nav windows, etc.). Additionally, a determination of whether any devices require additional time 406 (i.e., wider comm windows) is made ("Do Any Devices Require Additional Comms Time?") and if so ("Yes"), calculations are made to determine the additional comm window length required ("Calculate New Communication Window Needed For Additional Comms") 408. Otherwise ("No"), the next question is whether any devices are not in communication (directly or through another UWB-capable device) with the base station ("Have Any Devices Lost Comms?") 415. If so ("Yes"), then the base station—through its LPE—locks the device's comm window ("Lock Comms Window For Missing Device") 416 to ensure the device's comm window is "sanitized" to listen solely for the missing device and that the comm window is not reallocated to any other device(s). If no device has lost communication with the base station ("No"), then the next question is whether any new device has registered on the base station's local UWB network ("Have Any New Devices Registered On The Network?") 417. If so ("Yes"), the base station identifies the new device(s) allocates time 414 for new devices and transmits an acknowledgment of the same to the new device(s) ("Transmit Incident Comms ID To Registering Device") 418. If no new devices have registered ("No"), the base station then determines whether, based on any "Yes"-answers to the previous questions, a new timetable is needed ("Is a New Timetable Needed?") 419. If so ("Yes"), then the base station computes and generates 420 an updated ("new") timetable and broadcasts the same across the UWB network ("Transmit New Timetable") 421, then awaits the start of the Cycle phase ("Await Cycle Start" 422, at the end of the "Cycle Sync" phase).

At the beginning of the "Cycle Sync" 407 phase ("Cycle Sync"), the base station transmits a new timetable ("Transmit New Timetable") 421, then awaits the start of the Cycle Execution phase ("Await Cycle Start") 422.

At the beginning of the "Cycle Execution" phase ("Cycle Execution") 409, the base station gathers positional information from data packets transmitted directly from devices within the UWB network, or through the network itself ("Gather Raw Velocity/Bearing Sensor Data") 423. For each such data packet ("Packet Received") 424, the base station first determines whether the packet is valid ("Is Packet Valid?") 425. If the packet is not ("No"), it is discarded ("Discard Packet") 426. If it is valid ("Yes"), then a determination must be made as to whether the packet is new ("Is Packet New?") 427. If the packet is not ("No"), it is discarded ("Discard Packet") 428. If it is new ("Yes"), then it is assessed for emergency prioritization ("Is Packet Emergency Priority?") 429. If the packet is emergency-priority ("Yes"), it is queued ("Queue Emergency Information") 430 for review by the OSC. If it is not valid ("No"), then it is evaluated for positional data ("Does Packet Contain Positional Data?") 431. If it contains positional data ("Yes"), the LPE updates the device's position in the base station's memory and queues it for transmission across the network, ultimately to the device ("Update Unit Position in Memory and Queue") 432. If no positional data is contained in the packet ("No"), The packet is then assessed for biometric data ("Does Packet Contain Biometric Data?") 433. If biometric data is present in the packet ("Yes"), the data is stored in the base station's memory and queued for transmission to the device through the network ("Update Personnel Biometric Information and Queue") 434. Finally, all queued updates (emergency information, position and biometrics) are transmitted 435 throughout the UWB network, as well as via WI-FI link to the incident server.

Concomitantly with the above phases, each anchor, IGLU and EEL is performing complementary and/or relaying tasks to those of the base station. In the case of each anchor, the "Off-Cycle" actions (i.e., registration on the UWB network) are described above. At the start of the Cycle Prep phase, each anchor retrieves its stored positional-movement data ("Retrieve Stored Velocity/Bearing Delta") 436 to determine whether the anchor has moved out of tolerance to be reliable ("Has Unit Physically Moved Beyond Tolerance?") 437. If it has ("Yes") it will prepare a recalibration packet ("Prepare Recalibration Packet") 438 to be sent at the start of its comm window ("Start Comms Window") 439. If it has not ("No"), then the anchor will gather information about its status ("Gather Device Status") 440 and determine whether a change to that status has occurred since the last cycle ("Has Status Changed?") 441. If it has changed ("Yes"), it will prepare a status change packet ("Prepare Packet Status Change") 442 to be sent to the base station through the network. It will then prepare any received data packets to be sent queued ("Prepare Received Data Packets") 443 and sent during its normal comm window, and await the Cycle Sync phase ("Await Cycle Sync") 444.

During the Cycle Sync 407 phase, each anchor will receive the new timetable broadcast from the base station over the local UWB network ("New Timetable Received") 445, synching its local cycle clock ("Sync Local Cycle Clock") 446, processing the timetable and immediately retransmitting the same ("Process Timetable and Immediately Retransmit Timetable") 447 and await cycle start 448.

During the Cycle Execution phase 409, at the start of each anchor's comm window ("Start Comms Window") 439 the queued packets (i.e., those aggregated in the Cycle Prep phase) are "iterated through" ("Iterate Through Queued Packets") 449—until the comms window ends 456 that is, arranged for transmission in a "first-in, first-out" lineup and sent over multiple comm windows, if sufficient time is unavailable within the current comm window—during the anchor's comm window(s), as follows: The processor in the anchor determines the total number of packets needed to be transmitted ("Do Additional Packets Exist Beyond the Current Packet?") 450, and if additional packets ("Do Additional Packets Exist Beyond the Current Packet?") 451 must be transmitted beyond the current packet ("Yes"), the anchor's processor determines whether the estimated time available for transmitting the additional packets is sufficient ("Is Time Available in Comms Window for Additional Packets?") 452. If it is ("Yes"), the packet(s) is(are) sent in the current comm window, and the last data packet is marked as the final one to be transmitted ("Mark Packet as Final Transmission") 453 and the packets are all transmitted during the current comm window ("Transmit Queued Packet") 454. If more time is needed, the remaining packet(s) is(are) marked as pending and queued for transmission during the next comm window ("Mark Packet as Additional Packets Pending") 455.

During the Cycle Execution 409 but outside the anchor's comm window, standby-window functions are performed ("Start Standby Window") 457. These are gathering ("Gather Raw Velocity/Bearing Sensor Data") 458, calculating and storing AGM's movement data ("Calculate and Store Movement Delta Since Last Transmission") 459; receiving ("Packet Received") 424, processing and queuing other data packets (validity determination and storage is as described above) for transmission during its comm window ending the standby window 461.

Cycle Prep, Cycle Sync, Cycle Execution and Off-Cycle phases for the other devices are the same as for each anchor, with the following exceptions. During Cycle Prep, each IGLU 140 retrieves its stored AGM-derived movement data ("Retrieve Stored Velocity/Bearing Delta") 436 and prepares it for transmission during its comm window ("Prepare Positioning Packet") 463. Each IGLU also pairs 464 with and retrieves 465 information from its paired BMU, as described above, and sends the same—along with its AGM-derived movement data—during its comm window. The BMU receives the request for information 466 and sends back to the IGLU 140 biometric data 467. The IGLU 140 receives the biometric data 468 and prepares a biometric packet 469. The functioning of each EEL is the same as that for each anchor, except that the EEL does not contain an AGM, so no EEL acceleration data is transmitted in its data packet (although such data from other received data packets are of course transmitted).

The flowcharts included in this description and in the attached figures are examples of the methodology which may be used for the localization and monitoring of personnel in austere environs. In this description, it will be understood that each block of the flowchart illustrations, and combinations of blocks in the flowchart illustrations, can be implemented by computer program instructions. These computer program instructions may be loaded onto a computer or other programmable apparatus to produce a machine such that the instructions that execute on the computer or other programmable apparatus create means for implementing the functions specified in the flowchart block or blocks. These computer program instructions may also be stored in a computer-readable memory that can direct a computer or other programmable apparatus to function in a particular manner such that the instructions stored in the computer-readable memory produce an article of manufacture including instruction means that implement the function specified in the flowchart block or blocks. The computer program instructions may also be loaded onto a computer or other programmable apparatus to cause a series of operational steps to be performed in the computer or on the other programmable apparatus to produce a computer implemented process such that the instructions that execute on the computer or other programmable apparatus provide steps for implementing the functions specified in the flowchart block or blocks.

Accordingly, blocks of the flowchart illustrations support combinations of means for performing the specified functions and combinations of steps for performing the specified functions. It will also be understood that each block of the flowchart illustrations, and combinations of blocks in the flowchart illustrations, can be implemented by special purpose hardware-based computer systems that perform the specified functions or steps, or combinations of special purpose hardware and computer instructions.

Figure 5:
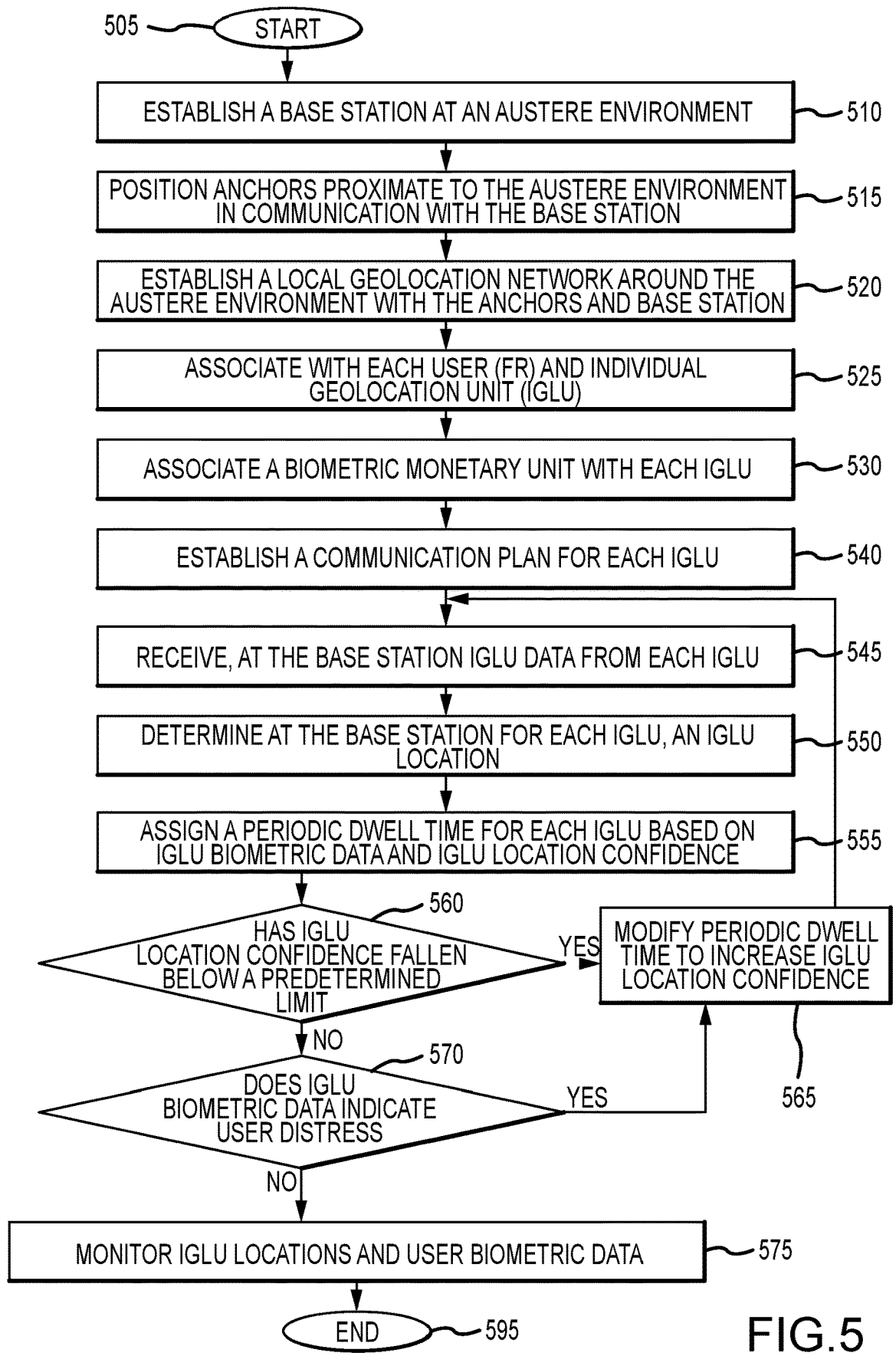
FIG. 5 is a flowchart of one embodiment of a methodology for personnel location and monitoring according to the present invention.

Consistent with the process described above, FIG. 5 presents a high-level flowchart user geolocation in an austere environment, according to one embodiment of the present invention. The process begins 505 upon arrival at an austere location with the establishment 510 of a base station. Shortly thereafter a plurality of anchors is positioned 515 proximate to the austere environment but within communication of the base station. Ideally and as described herein, each anchor is in a line-of-sight communication with either the base station or another anchor. With the base station and anchors positioned, a local geolocation network is established 520 around the austere environment.

Each user (First Responder (FR)) is associated 525 with an IGLU and each IGLU is associated 530 with a BMU. Once associated with a user each IGLU registers with the Base Station and a communication plan is established 540 between the Base Station and each IGLU.

As previously described each IGLU provides, and the Base Station received 545, IGLU data from which the Base Station can determine an IGLU location and monitor biometric data of the associated user. Using this data, the base station determines and assigns 555 a dwell time for each IGLU.

As the event unfolds, the on-scene commander monitors the location and status of each user in the environment. Using the established dwell times and the communication protocols discussed herein, a degree of IGLU location confidence is assigned to each IGLU. Responsive 560 to that degree of IGLU location confidence dropping below a predefined limit, the base station modifies 565 periodic dwell time placing a priority on raising the location confidence of the IGLU's which have dropped below the predefined limit. Upon re-establishing locational confidence, the dwell times are reassigned for normal operations.

Similarly, when the base station identifies 570 a user in distress based on monitoring the biometric data, periodic dwell time is again modified 565 to increase location confidence of that particular user. In some cases, the IGLU locational confidence may have not dropped below the predefined limit, however the raised concern for the user's wellbeing justifies a high degree of locational awareness and thus a modified dwell time. Once biometric data indicates the distress is no longer present, normal dwell times are resumed with each IGLU location and the associated user's biometric data being monitored 575, ending 595 the process.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve the manipulation of information elements. Typically, but not necessarily, such elements may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," "words", or the like. These specific words, however, are merely convenient labels and are to be associated with appropriate information elements.

The features and advantages described in this disclosure are not all-inclusive. Many additional features and advantages will be apparent to one of ordinary skill in the relevant art in view of the drawings, specification, and claims hereof. Moreover, it should be noted that the language used in the specification has been principally selected for readability and instructional purposes and may not have been selected to delineate or circumscribe the inventive subject matter; reference to the claims is necessary to determine such inventive subject matter.

The preceding description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

It will also be understood by those familiar with the art, that the invention may be embodied in other specific forms without departing from the spirit or essential characteristics thereof. Likewise, the particular naming and division of the modules, managers, functions, systems, engines, layers, features, attributes, methodologies, and other aspects are not mandatory or significant, and the mechanisms that implement the invention or its features may have different names, divisions, and/or formats. Furthermore, as will be apparent to one of ordinary skill in the relevant art, the modules, managers, functions, systems, engines, layers, features, attributes, methodologies, and other aspects of the invention can be implemented as software, hardware, firmware, or any combination of the three.

Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Accordingly, the disclosure of the present invention is intended to be illustrative, but not limiting, of the scope of the invention, which is set forth in the following claims.

Software programming code which embodies the present invention is typically accessed by a microprocessor from long-term, persistent storage media of some type, such as a flash drive or hard drive. The software programming code may be embodied on any of a variety of known media for use with a data processing system, such as a diskette, hard drive, CD-ROM, or the like. The code may be distributed on such media or may be distributed from the memory or storage of one computer system over a network of some type to other computer systems for use by such other systems. Alternatively, the programming code may be embodied in the memory of the device and accessed by a microprocessor using an internal bus. The techniques and methods for embodying software programming code in memory, on physical media, and/or distributing software code via networks are well known and will not be further discussed herein.

Generally, program modules include routines, programs, objects, components, data structures and the like that perform particular tasks or implement particular abstract data types. Moreover, those skilled in the art will appreciate that the invention can be practiced with other computer system configurations, including hand-held devices, multi-processor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

An exemplary system for implementing the invention includes a general purpose computing device such as the form of a conventional personal computer, a personal communication device or the like, including a processing unit, a system memory, and a system bus that couples various system components, including the system memory to the processing unit. The system bus may be any of several types of bus structures including a memory bus or memory controller, a peripheral bus, and a local bus using any of a variety of bus architectures. The system memory generally includes read-only memory (ROM) and random-access memory (RAM). A basic input/output system (BIOS), containing the basic routines that help to transfer information between elements within the computer, such as during start-up, is stored in ROM. The computer may further include a hard disk drive for reading from and writing to a hard disk, a magnetic disk drive for reading from or writing to a removable magnetic disk. The hard disk drive and magnetic disk drive are connected to the system bus by a hard disk drive interface and a magnetic disk drive interface, respectively. The drives and their associated computer-readable media provide non-transitory, non-volatile storage of computer readable instructions, data structures, program modules and other data for the personal computer. Although the exemplary environment described herein employs a hard disk and a removable magnetic disk, it should be appreciated by those skilled in the art that other types of computer readable media which can store data that is accessible by a computer may also be used in the exemplary operating environment.

While there have been described above the principles of the present invention in conjunction with a system and associated methodology for personal location and monitoring in austere environments, it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features that are already known per se and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The Applicant hereby reserves the right to formulate new claims to such features and/or combinations of such features during the prosecution of the present application or of any further application derived therefrom.

What is claimed is:

1. A system for geolocation in austere environments comprising:
   one or more Individual GeoLocation Units (IGLUs) wherein at least one IGLU is associated with a user and wherein each IGLU includes at least one transceiver configured to transmit ultra-wide band signals and a plurality of accelerometers configured to measure motion of the IGLU, and is further associated with a Biometric Monitoring Unit (BMU) configured to measure User Biometric Data (UBD) of the user; and
   a base station communicatively coupled to each IGLU, wherein the base station includes a Global Navigation Satellite System (GNSS) receiver and at least one transceiver and a Location Processing Engine (LPE) configured to receive and process the ultra-wide band signals from each IGLU and determine for each IGLU an IGLU location (IL) and an IGLU position confidence wherein the base station, responsive to one or more IGLUs failing to exceed a predetermined IGLU position confidence threshold, modifies one or more protocols to increase IGLU position confidence.

2. The system for geolocation hi austere environments according to claim 1, wherein each IGLU is configured to transmit, using at least one UWB transmitter, IGLU data using one or more data packets.

3. The system for geolocation in austere environments according to claim 1, wherein each IGLU is configured to relay the IL of another IGLU to the base station.

4. The system for geolocation in austere environments according to claim 3, wherein the base station determines IL using MLAT of received IGLU data and GNSS data of the base station.

5. The system for geolocation in austere environments according to claim 3, wherein the LPE is configured, responsive to IGLU position confidence failing to exceed a predetermined threshold, to modify a communication window for listening for UWB signals from the one of the one or more IGLUs failing to exceed a predetermined threshold to increase IGLU position confidence.

6. The system for geolocation in austere environments according to claim 5, wherein the LPE is configured, responsive to UBD indicating distress, to modify dwell time assignments to increase IGLU position confidence.

7. A method for geolocation in austere environments, the method comprising:
   associating an Individual GeoLocation Units (IGLUs) with a user wherein the IGLU includes plurality of accelerometers, a Biometric Monitoring Unit (BMU) and a ultra-wide band transceiver;
   measuring, by the accelerometers, motion data of the IGLU;
   measuring, by the BMU, User Biometric Data (UBD) of the user;
   transmitting, by the ultra-wide band transceiver, ultra-wide band signals, motion data and UBD;
   receiving at a base station by a transceiver, ultra-wide band signals, motion data and UBD wherein the base station includes a Location Processing Engine (LPE),
   processing by the LPE process the ultra-wide band signals, motion data and UBD from the IGLU and determining for the IGLU an IGLU location (IL) and an IGLU position confidence; and
   responsive to the IGLUs failing to exceed a predetermined IGLU position confidence threshold, modifying one or more protocols to increase IGLU position confidence.

8. The method for geolocation in austere environments according to claim 7, wherein transmitting includes sending MID and motion data using one or more data packets.

9. The method for geolocation in austere environments according to claim 7, further comprising relaying to the base station ultra-wide band signals, motion data and UBD of the IGLU by another IGLU.

10. The method for geolocation in austere environments according to claim 7, further comprising determining by the base station IL using MLAT ultra-wide band signals from the IGLU.

11. The method for geolocation in austere environments according to claim 7, wherein modifying includes modifying a communication window for listening for UWB signals from the IGLU.

12. The method for geolocation in austere environments to claim 7, further comprising, responsive to UBD indicating distress, modifying dwell time assignments to increase IGLU position confidence.

\* \* \* \* \*